(12) United States Patent
Ito et al.

(10) Patent No.: US 6,240,721 B1
(45) Date of Patent: Jun. 5, 2001

(54) INTERNAL COMBUSTION ENGINE AND METHOD FOR CONTROLLING AN INTERNAL COMBUSTION ENGINE

(75) Inventors: Takekazu Ito, Suntou-gun; Shizuo Sasaki; Kouji Yoshizaki, both of Numazu; Masato Gotoh; Hiroki Murata, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/377,618

(22) Filed: Aug. 19, 1999

(30) Foreign Application Priority Data

| Sep. 17, 1998 | (JP) | 10-263139 |
| Sep. 24, 1998 | (JP) | 10-269750 |
| Nov. 5, 1998 | (JP) | 10-314702 |
| Nov. 6, 1998 | (JP) | 10-316352 |

(51) Int. Cl.$^7$ ................................................. F01N 3/00
(52) U.S. Cl. ........................ 60/274; 60/284; 60/276; 60/278; 60/286; 60/285; 123/295
(58) Field of Search ........................ 60/274, 278, 286, 60/285, 284, 276; 123/295

(56) References Cited

U.S. PATENT DOCUMENTS

| 4,612,770 | * | 9/1986 | Tadokoro et al. | 60/284 |
| 5,916,130 | * | 6/1999 | Nakae et al. | 60/276 |
| 5,967,113 | * | 7/2000 | Kaneko et al. | 123/295 |
| 5,983,630 | * | 11/1999 | Kibe et al. | 60/285 |
| 5,987,884 | * | 11/1999 | Kibe et al. | 60/286 |
| 6,082,325 | * | 7/2000 | Digeser et al. | 60/278 |

* cited by examiner

*Primary Examiner*—Thomas Denion
*Assistant Examiner*—Thai-Ba Trieu
(74) *Attorney, Agent, or Firm*—Oliff & Berridge PLC

(57) ABSTRACT

A first combustion mode in which an amount of an EGR gas within a combustion chamber is higher than that of the EGR gas when a generated amount of soot reaches a peak and substantially no soot is generated. A second combustion mode in which the amount of the EGR gas within the combustion chamber is lower than that of the EGR gas when the generated amount of soot reaches the peak are selectively performed. A catalyst is disposed within an engine exhaust passage wherein a temperature of the catalyst is adjusted so as to be within a predetermined range.

32 Claims, 25 Drawing Sheets

INTERNAL COMBUSTION ENGINE AND METHOD FOR CONTROLLING AN INTERNAL COMBUSTION ENGINE

INCORPORATION BY REFERENCE

The disclosures of Japanese Patent Application Nos. HEI 10-269750 filed on Sep. 24, 1998; 10-316352 filed on Nov. 6, 1998; 10-263139 filed on Sep. 17, 1998; and 10-314702 filed on Nov. 5, 1998 including the specification, drawings, and abstract are incorporated herein by reference in their entirety.

BACKGROUND OF THE INVENTION

1. Field of the Invention

This invention relates to an internal combustion engine introducing inert gas into a combustion chamber to cause combustion.

2. Description of the Related Art

Recently, in an internal combustion engine, for example, a diesel engine, to restrict generation of nitrogen oxides NOx, the diesel engine is structured such that an engine exhaust passage and an engine intake passage are connected by an exhaust gas recirculation passage (hereinafter, refer to an EGR) for recirculating an exhaust gas, that is, an EGR gas, into the engine intake passage via the EGR passage. In this case, since the EGR gas has a relatively high specific heat and can absorb a large amount of heat, a combustion temperature within the combustion chamber is lowered as an amount of the EGR gas is increased, that is, a rate of the EGR (EGR gas amount/(EGR gas amount+intake air amount)) is increased. When the combustion temperature is lowered, a generated amount of nitrogen oxides NOx is lowered. Therefore, the more the EGR rate is increased, the lower the generated amount of nitrogen oxides NOx becomes.

As mentioned above, it has been conventionally known that the generated amount of nitrogen oxides NOx is lowered when the EGR rate is increased. However, in the case where the EGR rate is increased, a generated amount of soot, that is, smoke, suddenly starts increasing when the EGR rate exceeds a certain limit. With respect to this point, it has been conventionally considered that the smoke is unlimitedly increased when the EGR rate is increased beyond a certain limit. That is, it has been considered that the EGR rate at which the smoke suddenly starts increasing is the maximum allowable limit of the EGR rate. Accordingly, the EGR rate is defined within a range which does not exceed the maximum allowable limit. The maximum allowable limit of the EGR rate is significantly different in relation to the type of engine and fuel, however, is within a range between approximately 30% and 50%. Therefore, in the diesel engine, the EGR rate is restricted to the range between 30% and 50% at the maximum.

As mentioned above, since it has been conventionally considered that the maximum allowable limit exists with respect to the EGR rate, the EGR rate has been defined within a range which does not exceed the maximum allowable limit. Therefore, the generated amount of nitrogen oxides NOx becomes as small as possible. However, even when the EGR rate is defined as discussed above, a reduction in the generated amount of nitrogen oxides NOx has a limit such that in actuality a significant amount of nitrogen oxides NOx is still generated.

SUMMARY OF THE INVENTION

In the process of researching combustion in the diesel engine in consideration of the problems mentioned above, it has been found that, when making the EGR rate greater than the maximum allowable limit, the amount of generated smoke is suddenly increased, as discussed above. However, the generated amount of smoke has a peak, and when the EGR rate is further increased beyond the peak, the amount of generated smoke suddenly starts reducing at this point. This indicates that, when setting the EGR rate to a value equal to or more than 70% during an idling operation or strongly cooling the EGR gas, nitrogen oxides NOx are hardly generated and the amount of smoke generated becomes substantially zero. In other words, soot is hardly generated when the EGR rate is set to a value equal to or more than 55%. Thereafter, on the basis of this information, the reason why substantially no soot has been generated was considered.

It is ascertained, as a result of multiple experiments and research, that the growth of the hydrocarbon stops in the middle of the step before becoming soot when a temperature of the fuel and the surrounding gas during combustion within the combustion chamber is equal to or less than a predetermined temperature, and that the hydrocarbon becomes soot at a stroke when the temperature of the fuel and the surrounding gas reach the predetermined temperature. In this case, the temperature of the fuel and the surrounding gas is greatly influenced by an endothermic effect of the gas surrounding the fuel when the fuel is being burned, thereby making it possible to control the temperature of the fuel and the surrounding gas by adjusting the heat absorption amount of the gas surrounding the fuel in correspondence to the generated amount of smoke during combustion of the fuel.

Accordingly, when restricting the temperature of the fuel and the surrounding gas during combustion within the combustion chamber to the level equal to or less than the temperature at which the growth of the hydrocarbon stops soot is not generated. Thus, it is possible to restrict the temperature of the fuel and the surrounding gas during combustion within the combustion chamber to the level equal to or less than the temperature at which the growth of the hydrocarbon stops by adjusting the heat absorption amount of the gas surrounding the fuel. On the contrary, the hydrocarbon that stops growing before becoming soot can easily be cleaned by an after treatment using an oxidation catalyst or the like.

The combustion system, as mentioned above, cleans a hydrocarbon, or the like, which stops growing before becoming soot using the oxidation catalyst or the like. That is, when the oxidation catalyst or the like is not activated, combustion cannot be performed. However, since the temperature of the exhaust gas becomes low during an engine idling operation, the temperature of the catalyst is lowered if the engine is left in the idling operation state for an extended period of time. Then, the temperature of the catalyst becomes lower than the activation temperature at which the hydrocarbon or the like can be oxidized, and as a result, a large amount of hydrocarbon or the like is discharged into the ambient air.

In order to solve the above-mentioned problem, an object of this invention is to provide an internal combustion chamber which can adjust the temperature of a catalyst such that the temperature of the catalyst is within a desired range.

In order to achieve this object, in accordance with an aspect of this invention, there is provided an internal combustion engine wherein a generated amount of soot is gradually increased to a peak when increasing an amount of an inert gas supplied within a combustion chamber. The internal combustion engine includes an inert gas amount controller that controls an amount of the inert gas so that an amount of the inert gas supplied to the combustion chamber is more than an amount of the inert gas when the generated amount of soot reaches the peak. A catalyst is provided in an exhaust passage of an engine to perform oxidation. A detector detects a temperature of the catalyst and a catalyst temperature adjusting device adjusts the temperature of the catalyst within a predetermined temperature range.

Accordingly, it is possible to adjust the temperature of the catalyst such that the temperature of the catalyst is within a desired range.

BRIEF DESCRIPTION OF THE DRAWINGS

The invention will be described in conjunction with the following drawings in which like reference numerals designate like elements and wherein.

DESCRIPTION OF THE PREFERRED EMBODIMENT

Figure 1:
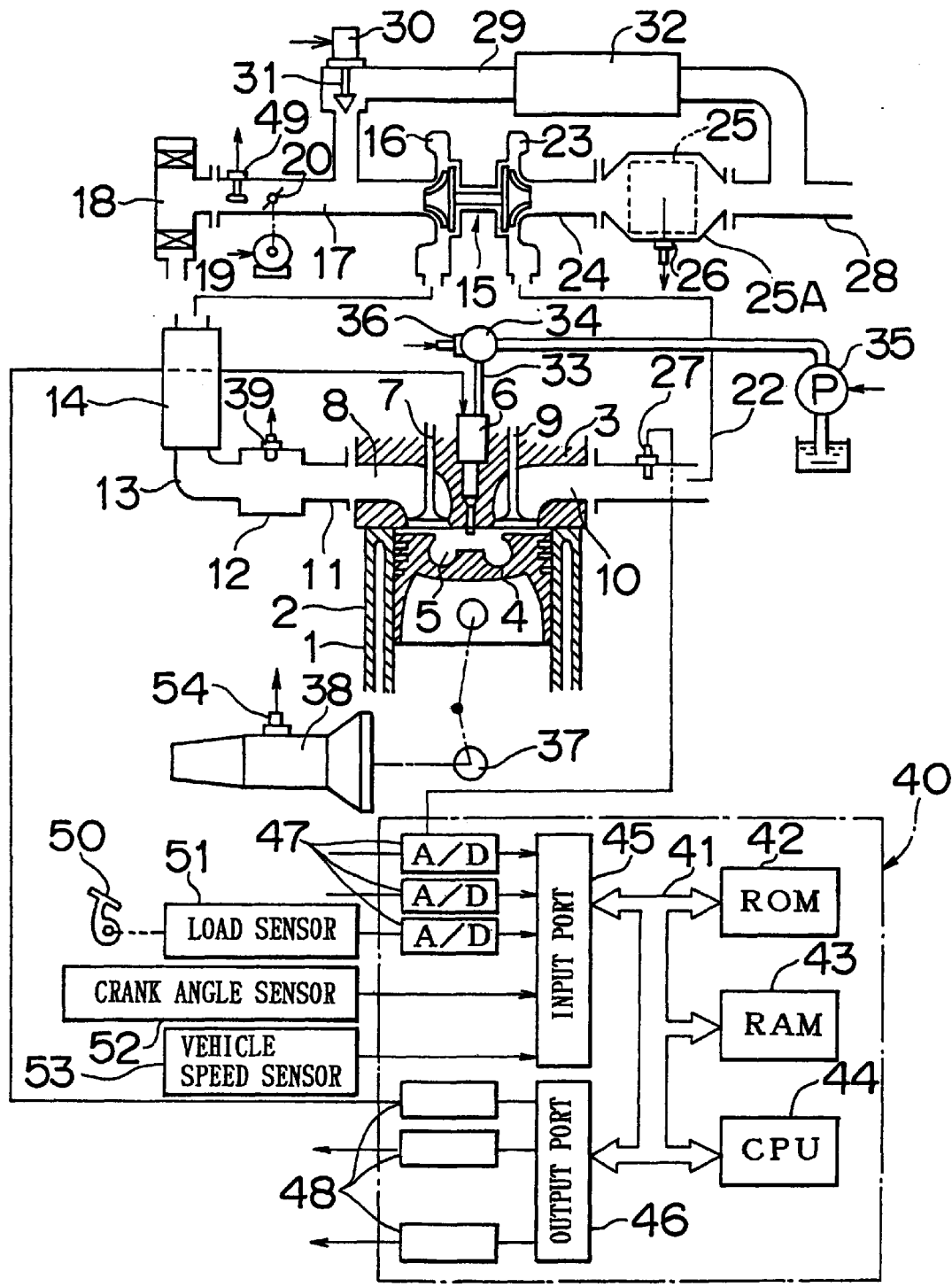
FIG. 1 is a schematic diagram of a four-stroke compression ignition type internal combustion engine according to an embodiment of this invention.
Figure 2:
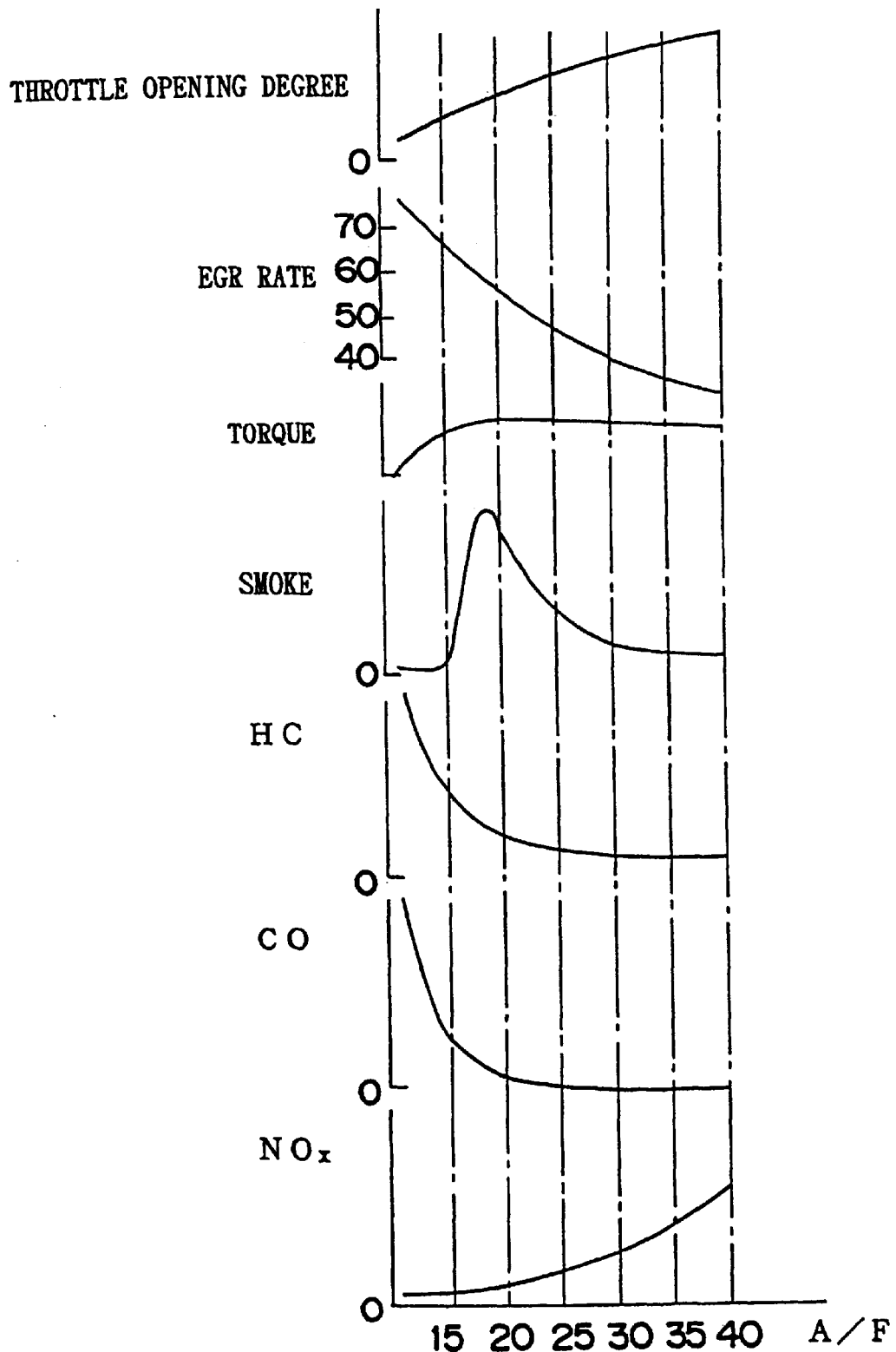
FIG. 2 is a graph showing experimental results of the engine in FIG. 1 relative to an air fuel ratio.

FIGS. 1 to 3 show a first embodiment in which this invention is applied to a 4-stroke compression ignition type internal combustion engine.

An engine main body 1 includes a cylinder block 2, a cylinder head 3, a piston 4, a combustion chamber 5, an electrically controlled type fuel injection valve 6, a pair of intake valves 7, an intake port 8, a pair of exhaust valves 9, and an exhaust port 10. The intake port 8 is connected to a surge tank 12 via a corresponding intake branch pipe 11, and the surge tank 12 is connected to a supercharger, for example, an outlet portion of a compressor 16 of an exhaust turbo charger 15 via an intake duct 13 and an inter cooler 14. An inlet portion of the compressor 16 is connected to an air cleaner 18 via an air intake pipe 17, and a throttle valve 20 driven by a step motor 19 is arranged within the air intake pipe 17. Further, a mass flow amount detecting device 49 for detecting a mass flow amount of the intake air is arranged within the air intake pipe 17 disposed upstream the throttle valve 20. A pressure sensor 39 for detecting an absolute pressure within a surge tank is arranged within the surge tank 12.

The exhaust port 10 is connected to an inlet portion of an exhaust turbine 23 of the exhaust turbo charger 15 via an exhaust manifold 22, and an outlet portion of the exhaust turbine 23 is connected to a catalytic converter 25A containing a catalyst 25 having an oxidation function therein via an exhaust pipe 24. A temperature sensor 26 for detecting a temperature of the catalyst 25 is arranged in the catalytic converter 25A. An air fuel ratio sensor 27 is arranged within the exhaust manifold 22.

An exhaust pipe 28 connected to an outlet portion of the catalytic converter 25A and the air intake pipe 17 disposed downstream the throttle valve 20 are connected to each other via an EGR passage 29, and an EGR control valve 31 driven by a step motor 30 is arranged within the EGR passage 29. Further, an inter cooler 32 for cooling an EGR gas flowing within the EGR passage 29 is arranged therein. In the embodiment shown in FIG. 1, engine cooling water is introduced into the inter cooler 32, and the EGR gas is cooled by the engine cooling water.

The fuel injection valve 6 is connected to a fuel reservoir 34, also known as a common rail, via a fuel supply pipe 33. The fuel is supplied to the common rail 34 from an electrically controlled fuel pump 35 in which a discharge amount is variable. The fuel in the common rail 34 is provided to the fuel injection valve 6 via the fuel supply pipe 33. A fuel pressure sensor 36 for detecting a fuel pressure within the common rail 34 is mounted to the common rail 34 so that the discharge amount of the fuel pump 35 can be controlled, whereby the fuel pressure within the common rail 34 becomes a target fuel pressure based on an output signal of the fuel pressure sensor 36. It should be noted that the fuel supply from the fuel injection valve 6 to the combustion chamber 5 is interrupted, i.e., stopping the flow of the fuel as occasion demands, and likewise execution of the interruption is prevented as occasion demands.

An electronic control unit (ECU) 40, also referred to as a controller, includes a digital computer and is provided with a read only memory (ROM) 42, a random access memory (RAM) 43, a microprocessor (CPU) 44, an input port 45 and an output port 46 mutually connected via a bi-directional bus 41. Output signals of the mass flow amount detecting device 49, the temperature sensor 26, the air fuel ratio sensor 27, the fuel pressure sensor 36 and the pressure sensor 39 are respectively input to the input port 45 via a corresponding analog/digital converter 47.

A load sensor 51 which generates an output voltage proportional to a depression amount L is connected to the accelerator pedal 50. An output voltage of the load sensor 51 is input to the input port 45 via the corresponding analog/digital converter 47. Further, a crank angle sensor 52 generates an output pulse every time the crank shaft rotates, for example, at 30 degrees, and is connected to the input port 45. An engine speed is calculated on the basis of the output value of the crank angle sensor 52. Also, an output pulse, which indicates a vehicle speed of the vehicle speed sensor 53, is input to the input port 45, and based on the output value of the vehicle speed sensor 53, a determination is made as to whether the vehicle is under a speed reduction condition or a speed increase condition. Moreover, an output signal of a neutral sensor 54, which detects whether an automatic transmission 38 is in a neutral position, is input to the input port 45. The output port 46 is connected to the fuel injection valve 6 via the step motor 19 to control the throttle valve 20, while the step motor 30 controls the EGR control valve 31 and the fuel pump 35 via the corresponding drive circuit 48.

The graph of FIG. 2 shows the experimental results of the change in an output torque, an amount of discharged smoke, hydrocarbon HC, carbon monoxide CO and nitrogen oxides NOx relative to the air fuel ratio A/F (an axis of abscissas in FIG. 2) by changing an opening degree of the throttle valve 16 and the EGR rate at a time of operating the engine under a low load. As is understood from the graph of FIG. 2, the smaller the air fuel ratio A/F becomes, the greater the EGR rate is, and the EGR rate becomes equal to or more than 65% when the air fuel ratio A/F is equal to or less than a stoichiometric air fuel ratio of approximately 14.6%.

As shown in FIG. 2, the air fuel ratio A/F decreases by increasing the EGR rate and the generated amount of smoke starts increasing when the EGR rate approaches 40% and the air fuel ratio A/F is nearly 30%. Then, when the EGR rate is further increased and the air fuel ratio A/F is further decreased, the generated amount of smoke suddenly increases to the peak. When the EGR rate is increased even further and the air fuel ratio A/F is correspondingly further decreased, the amount of generated smoke suddenly reduces, and when the air fuel ratio A/F approaches 15% by setting the EGR rate to a value equal to or more than 65%, the amount of generated smoke is approximately zero. That is, soot is hardly generated. At this time, the output torque of the engine is slightly reduced and the generated amount of nitrogen oxides NOx is significantly reduced. Contrarily, the generated amount of hydrocarbon HC and carbon monoxide CO starts increasing at this time.

Figure 3A:
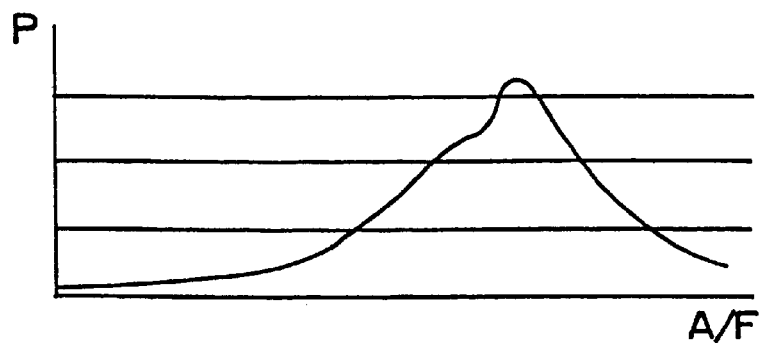
FIG. 3A is a graph showing the change of the pressure within the combustion chamber where the largest amount of smoke is generated.
Figure 3B:
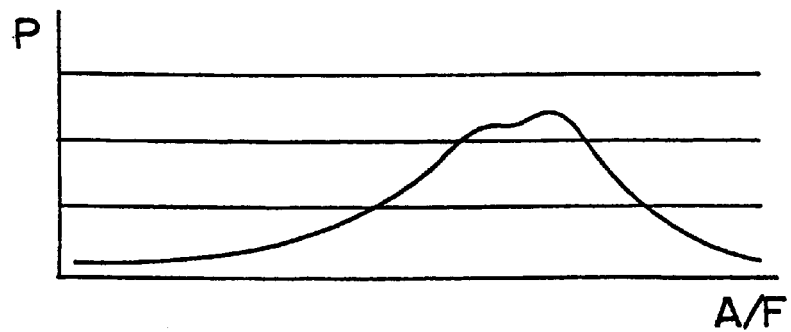
FIG. 3B is a graph showing the change of the pressure within the combustion chamber where the least amount of smoke is generated.

FIG. 3A is a graph showing the change in the combustion pressure within the combustion chamber 5 when the air fuel ratio A/F is near 21% and the generated amount of smoke is at the peak. FIG. 3B is a graph showing the change in the combustion pressure within the combustion chamber 5 when the air fuel ratio A/F is near 18% and the generated amount of the smoke is approximately zero. As can be understood by comparing FIGS. 3A and 3B, the combustion pressure shown in FIG. 3B is lower than as is shown in FIG. 3A.

The following explanation can be understood from the experimental results shown in the graphs of FIGS. 2, 3A, and 3B. That is, first, when the air fuel ratio A/F is equal to or less than 15% and the generated amount of smoke is approximately zero, the generated amount of nitrogen oxides NOx is significantly reduced, as shown in FIG. 2. The reduction of the generated amount of nitrogen oxides NOx means the reduction of the combustion temperature within the combustion chamber 5. It can be said that the combustion temperature within the combustion chamber 5 becomes low when the soot is hardly generated. The same result can be understood from the graphs of FIGS. 3A and 3B. That is, as shown in FIG. 3B, when soot is hardly generated, the combustion pressure becomes low, resulting in the combustion temperature within the combustion chamber 5 also becoming low.

Figure 4:
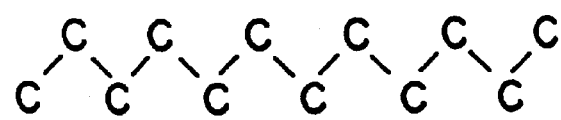
FIG. 4 shows examples of a molecule of a fuel.
Figure 4:
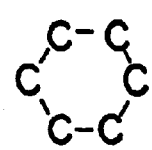
Figure 4:
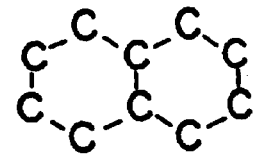
Figure 6:
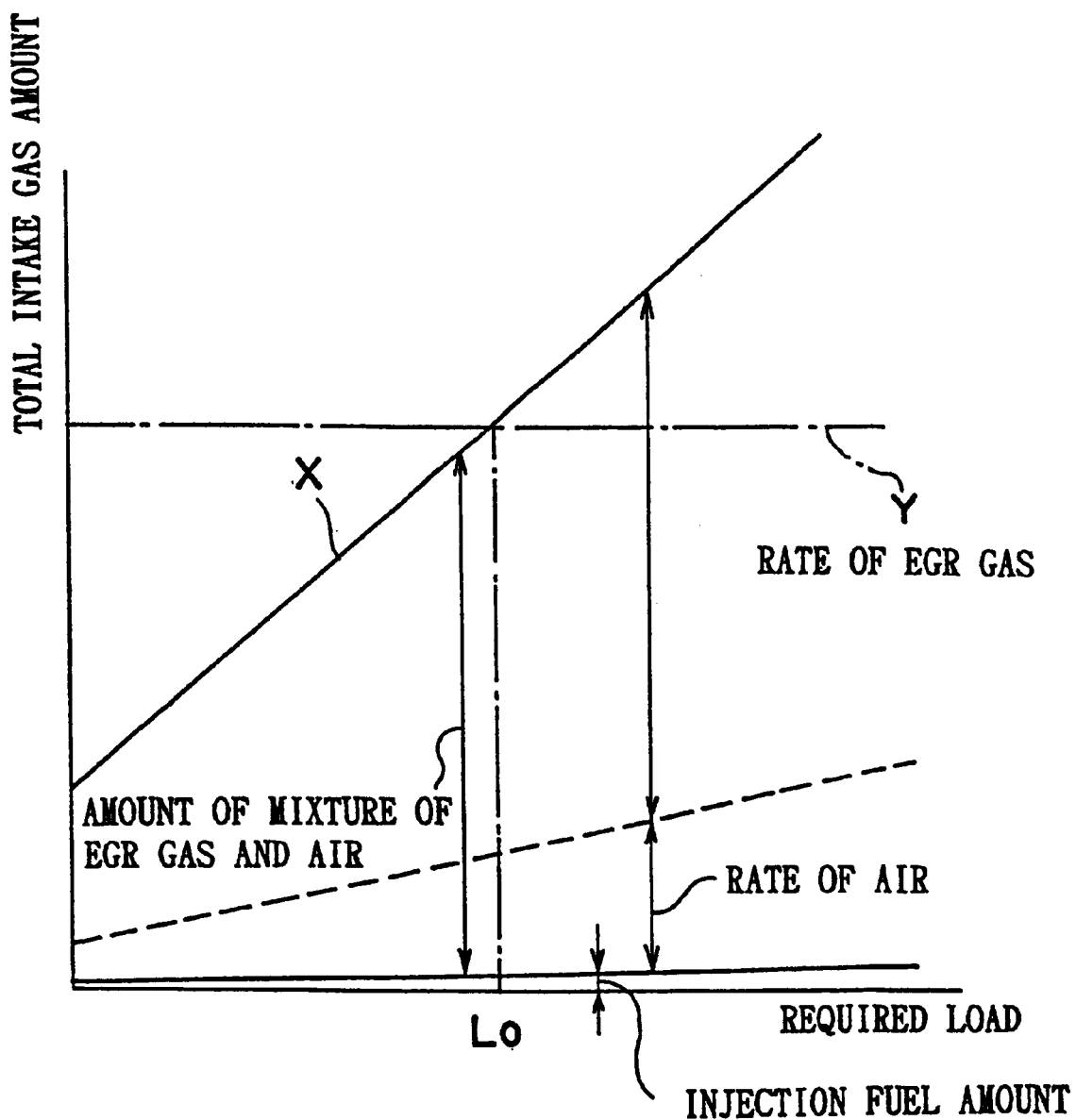
FIG. 6 is a graph showing a relationship between an amount of injected fuel and an amount of a gas mixture.

Secondly, when the generated amount of smoke, that is, the generated amount of soot, becomes approximately zero, the discharged amount of hydrocarbon HC and carbon monoxide CO increases as shown in FIG. 2. This means that the hydrocarbon HC is discharged without becoming soot. That is, in a straight chain hydrocarbon or an aromatic hydrocarbon, as shown in FIG. 4, contained in the fuel, when the temperature is increased in an oxygen poor state, a precursor of the soot is formed due to thermal decomposition, and ultimately results in the production of soot, including a solid mainly formed by an aggregation of carbon atoms. In this case, a process of producing the soot is complex such that it is indefinite what aspect the precursor of the soot forms. Regardless, the hydrocarbon shown in FIG. 4 becomes the soot via the precursor of the soot. Accordingly, as mentioned above, when the generated amount of soot becomes approximately zero, the discharged amount of hydrocarbon HC and carbon monoxide CO is increased, as shown in FIG. 6. However, hydrocarbon HC at this time corresponds to the precursor of the soot or the hydrocarbon in the preceding state.

Putting in order the considerations on the basis of the experimental results shown in the graphs of FIGS. 2, 3A, and 3B, when the combustion temperature within the combustion chamber 5 is low, the generated amount of soot becomes approximately zero, so that the precursor of the soot or the hydrocarbon in the preceding state is discharged from the combustion chamber 5. As a result, it becomes clear that the growing process of the soot stops on the way, that is, no soot is generated, when the temperature of the fuel and the surrounding gas within the combustion chamber 5 is equal to or less than a predetermined temperature, and that soot is generated when the temperature of the fuel and the surrounding gas within the combustion chamber 5 is equal to or more than the predetermined temperature.

In this case, the temperature of the fuel and the surrounding gas when the growing process of the hydrocarbon stops in a state of the precursor of the soot, that is, the predetermined temperature mentioned above changes due to various factors, such as, for example, the kind of fuel, compression ratio of the air fuel ratio A/F and the like. Accordingly, the predetermined temperature relates to the generated amount of nitrogen oxides NOx, such that the predetermined temperature can be defined from the generated amount of nitrogen oxides NOx at a predetermined level. That is, as the EGR rate is increased, the temperature of the fuel and the surrounding gas during combustion is reduced so that the generated amount of nitrogen oxides NOx is reduced. Concurrently, soot is hardly generated when the generated amount of nitrogen oxides NOx is approximately 10 p.p.m. or less. Accordingly, the predetermined temperature mentioned above substantially coincides with the temperature when the generated amount of nitrogen oxides NOx is approximately 10 p.p.m. or less.

Once soot is generated, the soot cannot be cleaned with after treatment using the oxidation function of the catalyst 25. Contrarily, the precursor of the soot or the hydrocarbon in the preceding state can be cleaned easily with after treatment using the oxidation function of the catalyst 25. As mentioned above, considering the after treatment using the catalyst 25, there is a significant difference between the results achieved from discharging the hydrocarbon from the combustion chamber 5 as the precursor of the soot or the preceding state, and the results achieved from discharging the hydrocarbon from the combustion chamber 5 as the soot. The combustion system used in this invention is basically designed to discharge the hydrocarbon from the combustion chamber 5 as the precursor of the soot or the preceding state without generating the soot within the combustion chamber 5 and oxidize the hydrocarbon using the oxidation function of the catalyst 25.

Further, in order to stop the growth of the hydrocarbon HC in the state prior to generation of soot, it is necessary to restrict the temperature of the fuel and the surrounding gas during combustion within the combustion chamber 5 to the temperature lower than the temperature at which soot is generated. In this case, it is clearly understood that the endothermic effect of the gas around the fuel when the fuel is burned significantly affects the restriction of the temperature of the fuel and the surrounding gas.

That is, when only air exists around the fuel, the evaporated fuel immediately reacts with oxygen in the air so as to burn. In this case, the temperature of the air apart from the fuel is not significantly increased, rather only the temperature around the fuel increases in a significant manner. That is, at this time, the air away from the fuel hardly performs the endothermic effect of the combustion heat in the fuel. In this case, since the combustion temperature becomes locally high in a significant manner, an unburned hydrocarbon HC to which the combustion heat is applied generates soot.

Contrarily, when the fuel in the mixed gas contains a large amount of inert gas and a small amount of air, the condition is slightly different. In this case, the evaporated fuel diffuses to the periphery and reacts with the oxygen contained in the inert gas in a mixed manner so as to burn. In this case, since the combustion heat is absorbed into the peripheral inert gas, the combustion temperature is not increased so much. That is, it is possible to restrict the combustion temperature to the low level. That is, in order to restrict the combustion temperature, existence of the inert gas performs an important part, so that it is possible to restrict the combustion temperature to the low level due to the endothermic effect of the inert gas.

In this case, in order to restrict the temperature of the fuel and the surrounding gas to the temperature lower than the temperature at which soot is generated, an amount of inert gas sufficient to absorb enough heat is required. Accordingly, when the amount of fuel increases, the required amount of inert gas increases in accordance therewith. As such, the higher the specific heat of the inert gas, the stronger the endothermic effect. Accordingly, a high specific heat is preferable for the inert gas. In view of this point, since carbon dioxide $CO_2$ and the EGR gas have a relatively high specific heat, it is preferable to use the EGR gas as the inert gas.

Figure 5:
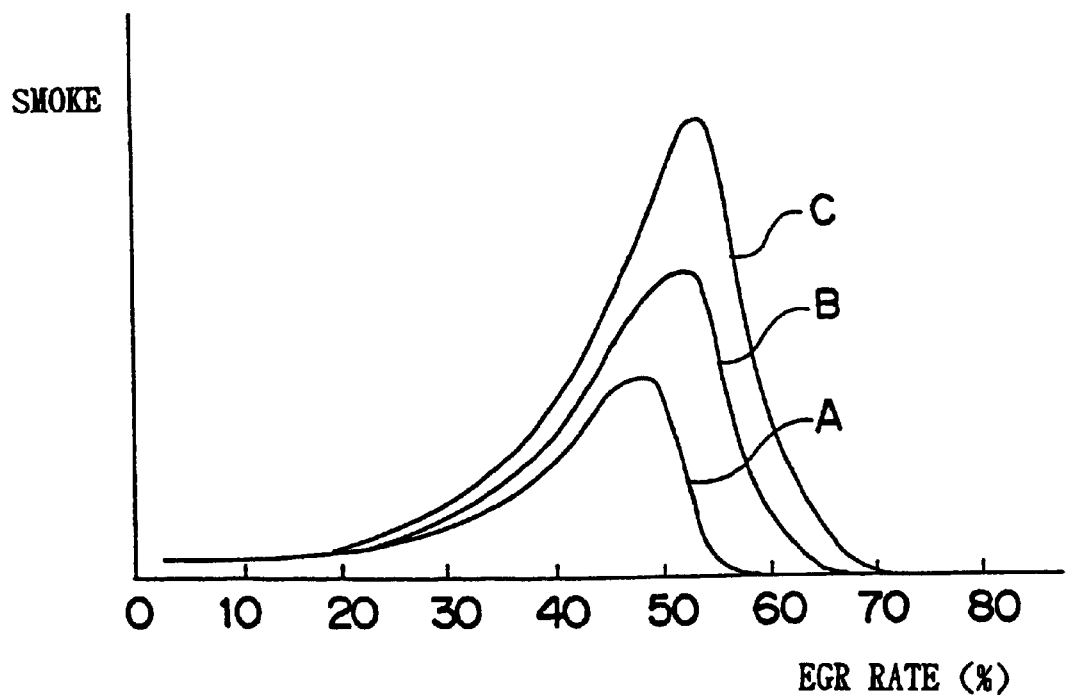
FIG. 5 is a graph showing a relationship between an amount of smoke generated and an EGR rate when the cooling degree of the EGR gas is changed.

FIG. 5 is a graph showing a relationship between the EGR rate and the smoke when using the EGR gas as the inert gas and the cooling degree of the EGR gas is changed. Curve A shows a case of strongly cooling the EGR gas so as to maintain the EGR gas temperature to substantially 90° C. Curve B shows a case of cooling the EGR gas by a compact cooling apparatus. Curve C shows a case of not forcibly cooling the EGR gas.

As shown by curve A, the generated amount of soot reaches a peak when the EGR rate is slightly lower than 50% and soot is hardly generated when the EGR rate is set to a level equal to or more than substantially 55%.

Contrarily, as shown by curve B, the generated amount of soot reaches a peak when the EGR rate is higher than 50% and soot is hardly generated when the EGR rate is set to a level equal to or more than 65%.

Further, as shown by curve C, the generated amount of soot reaches a peak when the EGR rate is approximately 55% and soot is hardly generated when the EGR rate is set to a level equal to or more than 70%.

In this case, FIG. 5 shows the generated amount of smoke when the engine load is comparatively high, when the engine load is decreased, when the EGR rate at which the generated amount of soot reaches the peak is slightly reduced, and the lower limit of the EGR rate at which soot is hardly generated is slightly reduced. As mentioned above, the lower limit of the EGR rate at which soot is hardly generated changes in relation to the cooling degree of the EGR gas and the engine load.

FIG. 6 is a graph showing the relationship between an amount of a gas mixture of the EGR gas and air necessary for making the temperature of the fuel and the surrounding gas during combustion when the EGR gas is used as the inert gas at a temperature lower than a temperature at which soot is generated, and a rate of the air and the EGR gas in the mixed gas. The vertical axis represents a total amount of intake gas introduced into the combustion chamber 5, while a chain line Y shows a total amount of intake gas capable of being introduced within the combustion chamber 5 when supercharging is not performed. Further, the horizontal axis of FIG. 6 represents a required load.

Looking at FIG. 6, the rate of the air, that is, the amount of air in the mixed gas represents an amount of air required to completely burn the injected fuel. That is, a ratio between the amount of air and the amount of injection fuel corresponds to the stoichiometric air fuel ratio. On the contrary, the rate of the EGR gas, that is, the amount of EGR gas in the mixed gas represents the minimum amount of EGR gas required to establish the temperature of the fuel and the surrounding gas during burning of the injected fuel to be lower than the temperature at which the soot is generated. The amount of EGR gas is substantially equal to or greater than 55% relative to the EGR rate. The amount of EGR gas shown in FIG. 6 is equal to or greater than 70%. That is, assuming that the total amount of intake gas introduced into the combustion chamber 5 is represented by a solid line X in FIG. 6, and the rate between the amount of air and the amount of EGR gas among the total intake gas amount X is set to the level shown in FIG. 6, the temperature of the fuel and the surrounding gas becomes lower than the temperature at which the soot is generated, thus generating substantially no soot. Further, the amount of nitrogen oxides NOx generated at this time results in a significantly small amount of soot, i.e., approximately 10 p.p.m. or less.

Since the amount of heat generated when the fuel is burned is increased as the amount of fuel injection is increased, the amount of heat absorbed by the EGR gas has to be increased so as to maintain the temperature of the fuel and the surrounding gas to be lower than the temperature at which the soot is generated. Accordingly, as shown in FIG. 6, the amount of EGR gas should be increased along with the increase in the injection fuel amount. That is, the amount of EGR gas should be increased as the required load is increased.

Here, in the case where no supercharging is performed, the upper limit of the total amount of intake gas X is defined by the chain line Y. Therefore, as shown in FIG. 6, when the required load is larger than $L_0$, the air fuel ratio cannot be maintained to the stoichiometric air fuel ratio unless the EGR gas rate is reduced. In other words, when trying to maintain the air fuel ratio to the stoichiometric air fuel ratio in the region where the desired load is larger than $L_0$ when no supercharging is performed, the EGR rate is reduced as the required load becomes high, and accordingly, in the area at the desired load larger than $L_0$, it is impossible to maintain the temperature of the fuel and the surrounding gas to be lower than the temperature at which the soot is generated.

However, as shown in FIG. 1, when recirculating the EGR gas into the inlet side of the supercharger, that is, the air intake pipe 17 of the exhaust turbo charger 15 via the EGR passage 29, in the region where the required load is larger than $L_0$, it is possible to maintain the EGR rate at a level substantially equal to or greater than 55%, such as, for example, 70%. Therefore, it is possible to maintain the temperature of the fuel and the surrounding gas to be lower temperature than the temperature at which the soot is generated. That is, when recirculating the EGR gas such that the EGR rate within the air intake pipe 17 becomes, for example, 70%, the EGR rate of the intake gas having the pressure increased by the compressor 16 of the exhaust turbo charger 15 also becomes 70%. As a result, the temperature of the fuel and the surrounding gas can be maintained to be lower than the temperature at which the soot is generated such that the compressor 16 is permitted to increase the pressure. Accordingly, it is possible to expand an operation range of the engine to produce the low combustion temperature.

As such, when setting the EGR rate to a level substantially equal to or more than 55% in the region where the required load is higher than $L_0$, the EGR control valve 31 is fully opened and the throttle valve 20 is slightly closed.

As mentioned above, FIG. 6 shows the case where the fuel is burned at the stoichiometric air fuel ratio. However, even when setting the air amount to be less than the value shown in FIG. 6, that is, setting the air fuel ratio to a rich state, it is possible to restrict the amount of nitrogen oxides NOx generated to approximately 10 p.p.m. or less while preventing the generation of soot. Meanwhile, even when setting the amount of air to be more than the value shown in FIG. 6, that is, setting an average value of the air fuel ratio to be in a lean state, such as, for example, 17% to 18%, it is possible to restrict the amount of nitrogen oxides NOx generated to approximately 10 p.p.m. or less while preventing generation of the soot.

That is, when the air fuel ratio is set to the rich state, the amount of fuel becomes excessive. However, since the combustion temperature is restricted to be low, the excessive fuel does not generate soot, resulting in no generation of soot. At the same time, only a small amount of nitrogen oxides NOx is generated. Meanwhile, when the average air fuel ratio is in a lean state, or even when the air fuel ratio is stoichiometric, a high combustion temperature may lead to production of a small amount of soot. However, in accordance with this invention, as the combustion temperature is kept low, no soot is generated. Further, the amount of nitrogen oxides NOx is substantially small.

As mentioned above, as long as the combustion temperature is low, substantially no soot is generated irrespective of the air fuel ratio, which may be rich, lean or stoichiometric. Accordingly, in view of the improved specific fuel consumption, it is preferable to set the average air fuel ratio to a lean value for improving fuel consumption.

The temperature of the fuel and the surrounding gas during combustion in the combustion chamber can be restricted to be lower than the temperature at which the hydrocarbon HC growth is interrupted only when the engine is operated at a middle or low load where the amount of heat generated by the combustion is relatively small. Accordingly, in this embodiment of this invention, during the middle or low engine load operation the temperature of the fuel and the surrounding gas during combustion is limited to be substantially equal to or less than the temperature at which the growth of the hydrocarbon HC is interrupted such that the first combustion, that is, the low temperature combustion, is conducted. Meanwhile, during the high load operation, the second combustion, that is, the conventional combustion, is performed. In this case, the first combustion, that is, the low temperature combustion means, a combustion in which the amount of the inert gas within the combustion chamber is greater than the amount of the inert gas at a time when the amount of soot generated reaches an upper limit, thus generating substantially no soot, as is apparent from the above explanation. The second combustion, that is, the conventional combustion means a combustion in which the amount of the inert gas within the combustion chamber is smaller than the amount of the inert gas when the generation amount of the soot becomes peak.

Figure 7:
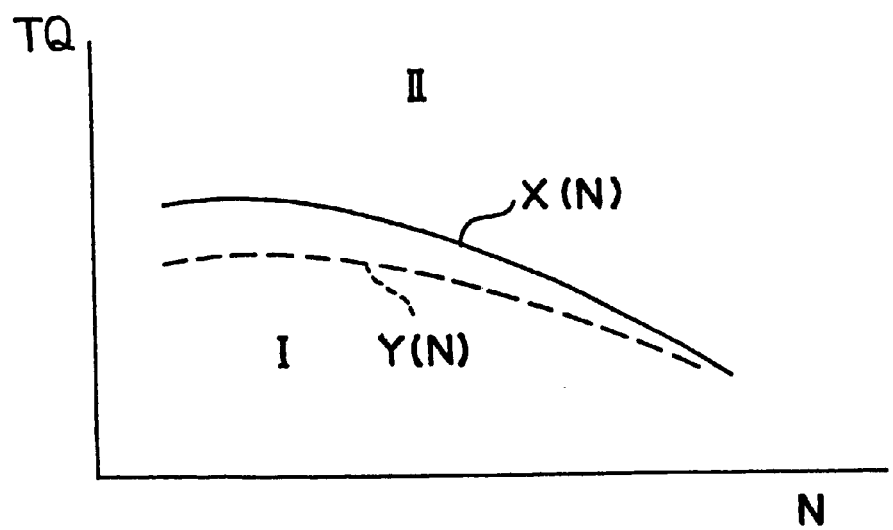
FIG. 7 is a graph showing the relationship between the required torque and engine speed during the first and second combustions and the areas of operation therein.

FIG. 7 is a graph showing the relationship between the required torque and engine speed during first and second combustions and the areas of operation therein. Operation area I corresponds to the first operation area in which the first combustion mode, that is, the low temperature combustion, is performed, and operation area II corresponds to the second operation area in which the second combustion mode, that is, the conventional combustion method, is performed. The ordinate TQ indicates a pedaling amount of the accelerator pedal 50, that is, a required torque, and the abscissas N indicates an engine speed. Further, X(N) represents a first boundary between the first operation area I and the second operation area II, and Y(N) represents a second boundary between the first operation area I and the second operation area II. A change of the operation area from the first operation area I to the second operation area II is determined on the basis of the first boundary X(N). A change of the operation area from the second operation area II to the first operation area I is determined on the basis of the second boundary Y(N).

That is, when the required torque TQ exceeds the first boundary X(N) corresponding to the function of the engine speed N when the operation state of the engine is in the first operation area I and the low temperature combustion is performed, it is determined that the operation area has moved to the second operation area II where combustion is performed in accordance with the conventional combustion method. Next, when the required torque TQ becomes lower than the second boundary Y(N), it is determined that the operation area has moved to the first operation area I where the low temperature combustion is again performed.

The first boundary X(N) and the second boundary Y(N) are provided because the combustion temperature is relatively high at the high load side in the second operation area II and low temperature combustion cannot immediately be performed even when the required torque TQ becomes lower than the first boundary X(N). That is, the low temperature combustion is not immediately performed because the low temperature combustion is only started when the required torque TQ substantially decreases such that it is lower than the second boundary Y(N). Also, a hysteresis is provided with respect to the change of the operation area between the first operation area I and the second operation area II.

In this case, when the engine operation state exists in the first operation area I and low temperature combustion is performed, soot is hardly generated, and in place thereof, unburned hydrocarbon HC is discharged from the combustion chamber 5 as the precursor of soot or the state prior thereto. At this time, if the catalyst 25 is activated, the unburned hydrocarbon HC discharged from the combustion chamber 5 is well oxidized by the oxidization function of the catalyst 25.

An oxidation catalyst, a three way catalyst or an nitrogen oxides NOx absorbent can be used as the catalyst 25. The nitrogen oxides NOx absorbent has a function of absorbing nitrogen oxides NOx when the average air fuel ratio within the combustion chamber 5 is in the lean state and discharges nitrogen oxides NOx when the average air fuel ratio within the combustion chamber 5 is in the rich state.

The nitrogen oxides NOx absorbent is formed of a carrier, such as, for example, an alumina on which a noble metal such as Platinum Pt and at least one element selected from an alkaline metal (potassium K, sodium Na, lithium Li cesium Cs or the like), an alkaline earth metal (barium Ba calcium Ca, or the like), and a rare earth metal (lanthanum La, yttrium Y or the like) are carried.

Besides the oxidation catalyst, the three way catalyst and the nitrogen oxides NOx absorbent have the oxidation function. Therefore, the three-way catalyst and the nitrogen oxides NOx can be used as the catalyst 25.

Figure 8:
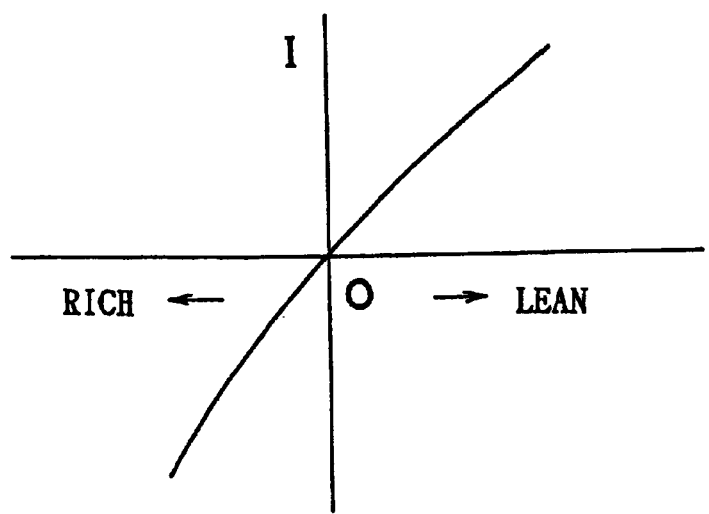
FIG. 8 is a graph showing an output of the air fuel ratio sensor.

FIG. 8 is a graph showing an output of the air fuel ratio sensor 27. An output current I of the air fuel ratio sensor 27 changes relative to the air fuel ratio A/F. Accordingly, the air fuel ratio A/F can be determined from the output current I of the air fuel ratio sensor 27.

Next, referring to FIG. 9, the description will be given with respect to the operation control in the first operation area I and the second operation area II.

Figure 9:
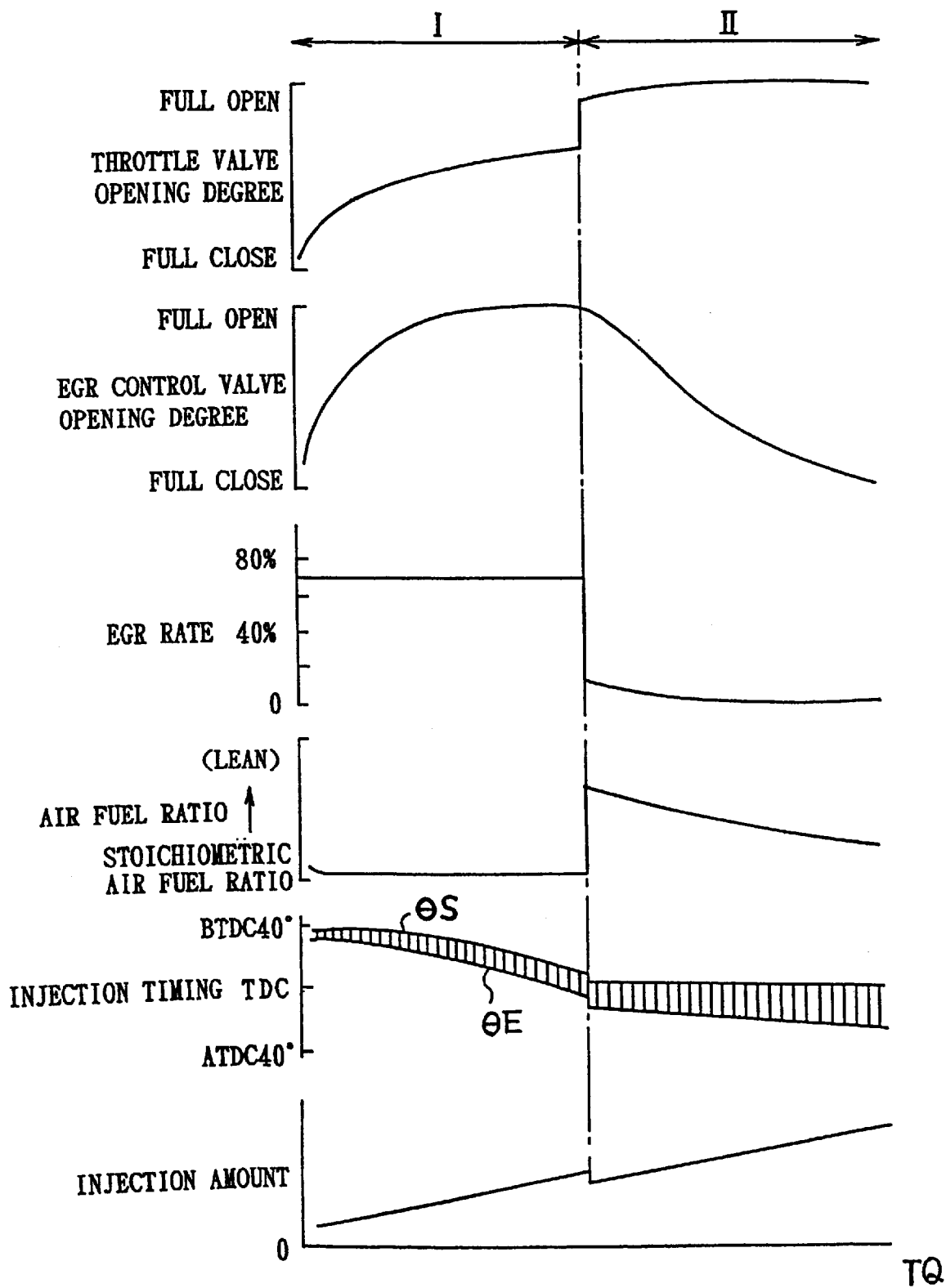
FIG. 9 is a graph showing experimental results of the engine in FIG. 1 relative to a required load.

FIG. 9 shows a relationship among an opening degree of the throttle valve 20 with respect to the required torque TQ, an opening degree of the EGR control valve 31, an EGR rate, an air fuel ratio, an injection timing and an injection amount each relative to a required load L. In the first operation area I having the low required torque TQ, the opening degree of the throttle valve 20 is gradually increased to about two-thirds of the opening degree as the required torque TQ is increased. Further, the opening degree of the EGR control valve 23 is gradually increased to a full open state from the nearly full closed state as the required torque TQ is increased. Furthermore, the EGR rate is set to substantially 70% in the first operation area. I, while the air fuel ratio is set to a slight lean state.

In other words, in the first operation area I, the opening degree of the throttle valve 20 and the opening degree of the EGR control valve 31 are controlled such that the EGR rate becomes approximately 70% and the air fuel ratio is in the slight lean state. In the first operation area I, fuel injection is performed prior to compression at a top dead center TDC. In this case, an injection start timing θS is delayed as the required load L becomes high, and an injection end timing θE is also delayed as the injection start timing θS is delayed.

Further, during idling operation, the throttle valve 20 and EGR control valve 31 are simultaneously nearly in the full closed state. When closing the throttle valve 20 to the nearly full closed state, a pressure within the combustion chamber 5 at the beginning of the compression becomes low, thus reducing the compression pressure. When the compression pressure is lowered, compression work executed by the piston 4 is reduced to decrease vibration of the engine main body 1. That is, during idling operation, in order to restrict the vibration of the engine main body 1, the throttle valve 20 is closed nearly to the full closed state.

Contrarily, the operation area of the engine shifts from the first operation area I to the second operation area II and the throttle valve 20 is increased stepwise from approximately two-thirds of the opening degree to the full open state. At this time, the EGR rate is decreased stepwise from approximately 70% to 40% or less, thereby increasing the air fuel ratio. That is, as the EGR rate skips over the EGR rate range (FIG. 5) where a large amount of smoke is generated, the generation of such smoke can be prevented when the operation area of the engine shifts from the first operation area I to the second operation area II.

In the second operation area II, the second combustion, that is, conventional combustion, is performed. The second combustion generates small amounts of soot and nitrogen oxides NOx, however, the heat efficiency is higher than that of the low temperature combustion, or first combustion. When the operation area of the engine shifts from the first operation area I to the second operation area II, the injection amount is decreased stepwise. In the second operation area II, the throttle valve 20 is kept in the full open state with a few exceptions, and the opening degree of the EGR control valve 31 is gradually reduced as the required torque TQ becomes high. Furthermore, in the second operation area II, the EGR rate becomes low as the required torque TQ becomes high, and the air fuel ratio becomes small as the required torque TQ becomes high. However, the air fuel ratio is set to the lean air fuel ratio even when the required torque TQ becomes high. Further, in the second operation area II, the injection start timing OS is set near the compression top dead center TDC.

Figure 10A:
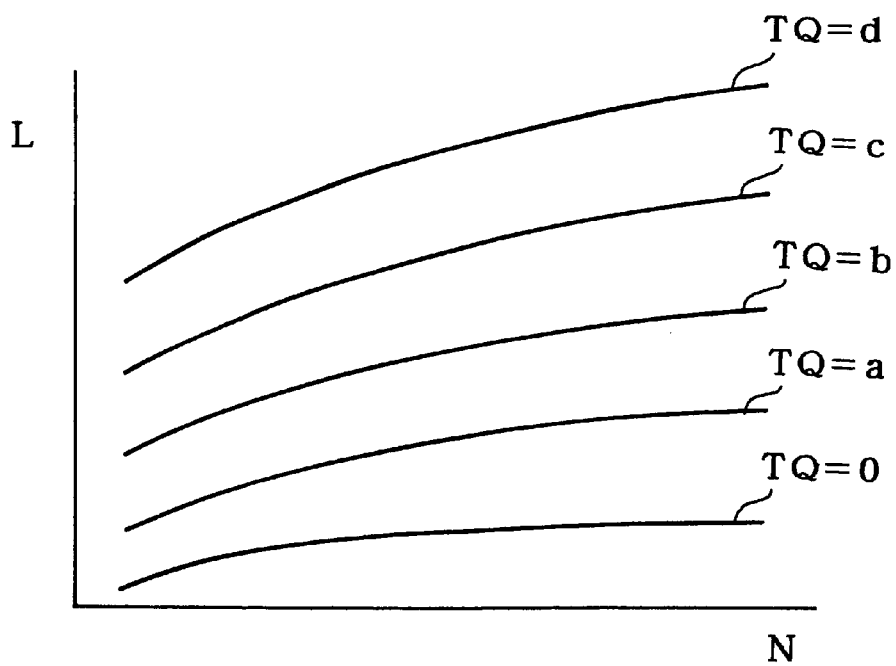
FIG. 10A is a graph showing a relationship between the required torque relative to the depression amount and engine speed.
Figure 10B:
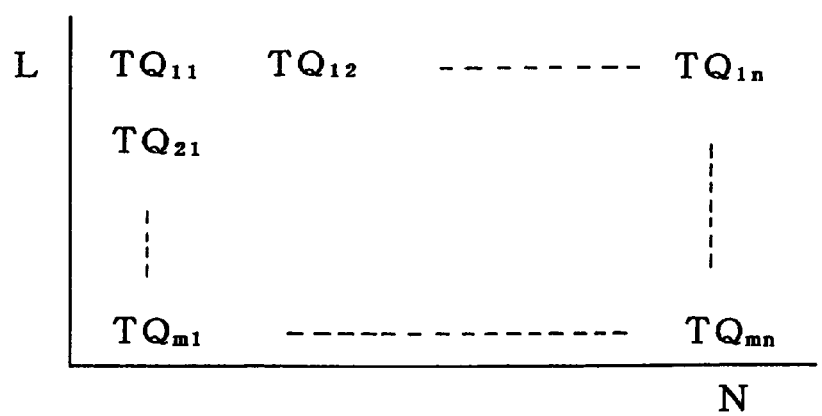
FIG. 10B is a map used to calculate the required torque relative to the depression amount and engine speed.

FIG. 10A is a graph showing a relationship between the required torque TQ relative to the depression amount L of the accelerator pedal 50 and the engine speed N. Each curve of FIG. 10A represents an equivalent torque curve. The curve showing TQ=0 indicates that the torque is zero and in the remaining curves, the required torque TQ is gradually increased in the order of TQ=a, TQ=b, TQ=c and TQ=d. The required torque TQ shown in FIG. 10A has been previously stored in the ROM 42 in the form of a map as a function between the depression amount L of the accelerator pedal 50 and the engine speed N, as shown in FIG. 10B. In accordance with this invention, the required torque TQ corresponding to the depression amount L of the accelerator pedal 50 and the engine speed N is first calculated from the map shown in FIG. 10B, and the fuel injection amount is calculated on the basis of the required torque TQ.

Figure 11:
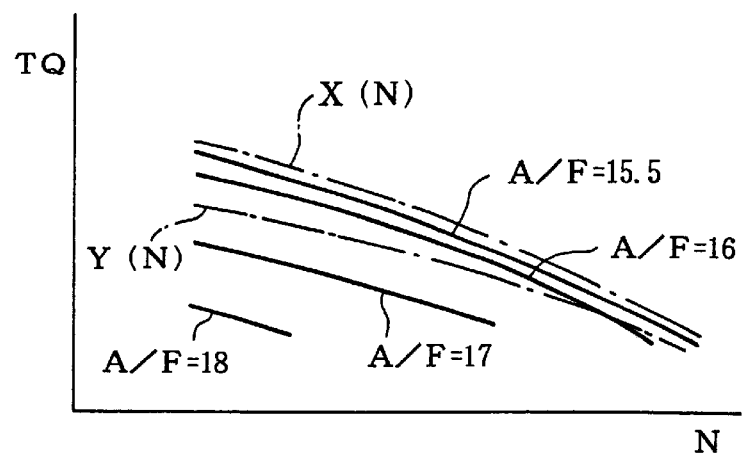
FIG. 11 is a graph showing an air fuel ratio relative to the required torque and engine speed in the first operation area.

FIG. 11 is a graph showing an air fuel ratio A/F relative to the required torque TQ and engine speed N in the first operation area I. Curves indicated by A/F=15.5, A/F=16, A/F=17 and A/F=18 show states having target air fuel ratios 15.5, 16, 17 and 18, respectively, where each of the air fuel ratios between the curves is calculated in accordance with a proportional allotment. As shown in FIG. 11, the air fuel ratio is in a lean state in the first operation area I, and the air fuel ratio A/F becomes lean as the required torque TQ decreases.

That is, the heat due to combustion is reduced as the required load L decreases. Accordingly, the low temperature combustion can be performed even when lowering the EGR rate as the required torque TQ decreases. When lowering the EGR rate, the air fuel ratio A/F increases. Accordingly, as shown in FIG. 11, the air fuel ratio A/F increases as the required torque TQ decreases. As the air fuel ratio A/F is increased, the specific fuel consumption is improved. Accordingly, in order to make the air fuel ratio A/F as lean as possible, the air fuel ratio A/F is increased as the required torque TQ is decreased.

Figure 12A:
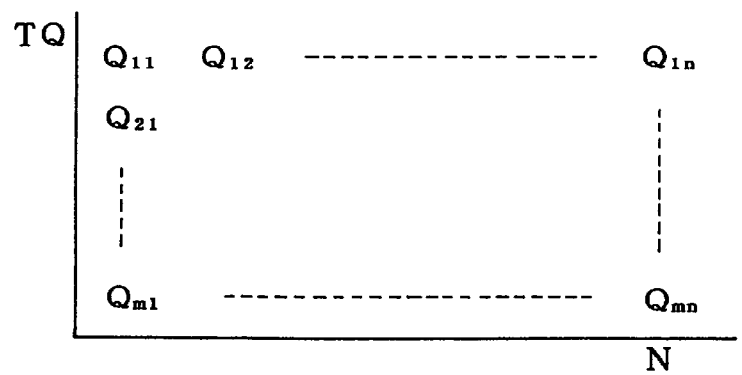
FIG. 12A is a map of the injection amount in the first operation area as a function of the required torque and engine speed.
Figure 12B:
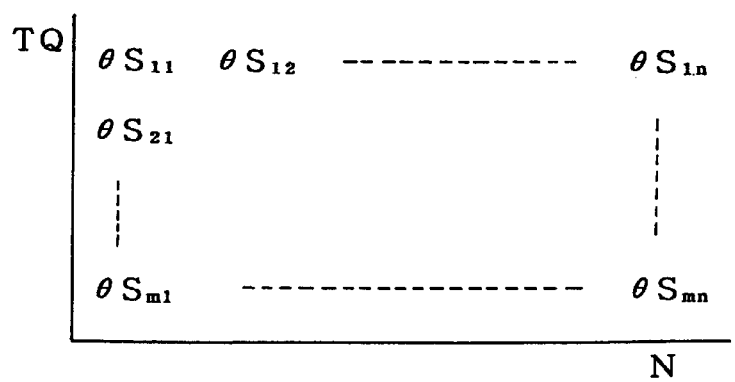
FIG. 12B is a map of the standard injection start timing in the first operation area as a function of the required torque and engine speed.

FIGS. 12A and 12B are maps showing an injection amount Q and an injection start timing $\theta S_i n$, respectively, in the first operation area I as a function of the required torque and engine speed. Both the injection amount Q (FIG. 12A) and the injection start timing $\theta S$ (FIG. 12B) are previously stored within the ROM 42 as a function of the required torque TQ and the engine speed N in the form of a map.

Figure 13A:
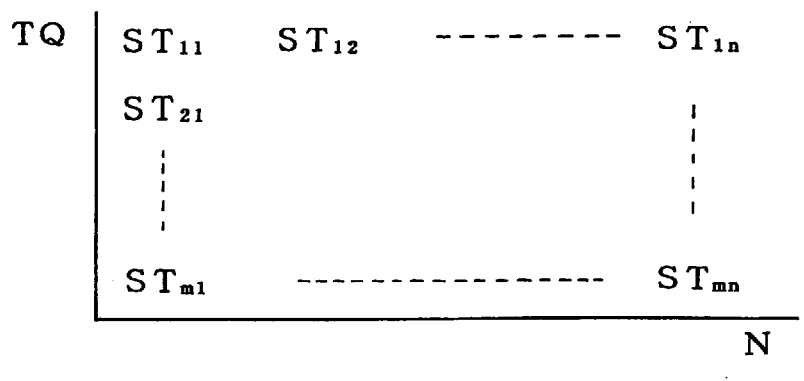
FIG. 13A is a map of the target opening degree of the throttle valve.
Figure 13B:
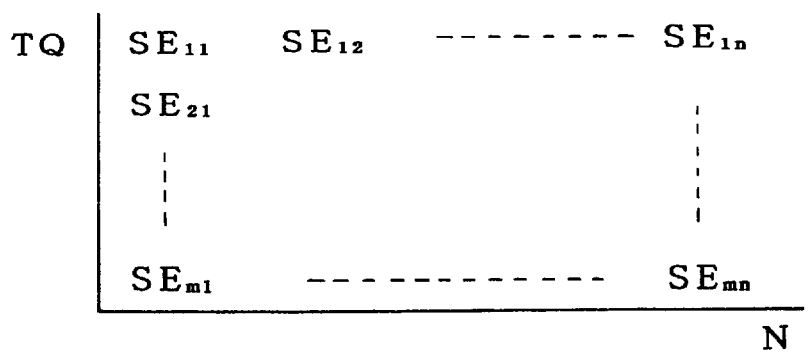
FIG. 13B is a map of the EGR control valve.

In this case, the target opening degree ST of the throttle valve 20 required for setting the air fuel ratio A/F to the target air fuel ratio shown in FIG. 10 and a target opening degree SE of the EGR control valve are previously stored within the ROM 32 as a function of the required torque TQ and the engine speed N in the form of a map, as shown in FIGS. 13A and 13B, respectively.

Figure 13C:
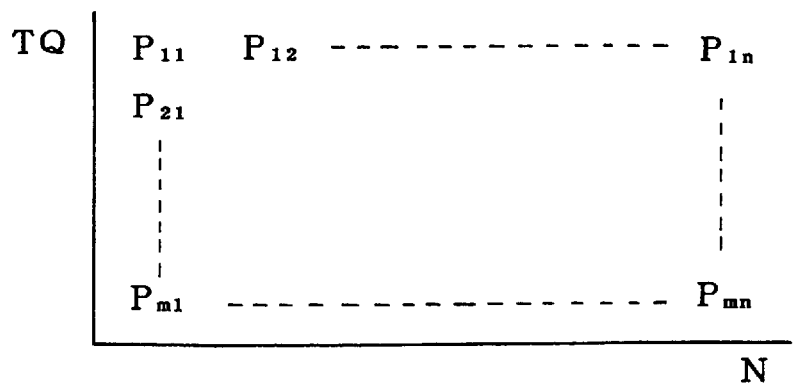
FIG. 13C is a map of the target fuel pressure in the common rail.

Further, a fuel injection pressure in the first operation area I, that is, a target fuel pressure P within the common rail 34 is previously stored in the ROM 42 as a function of the required torque TQ and the engine speed N in the form of a map as shown in FIG. 13C.

Figure 14:
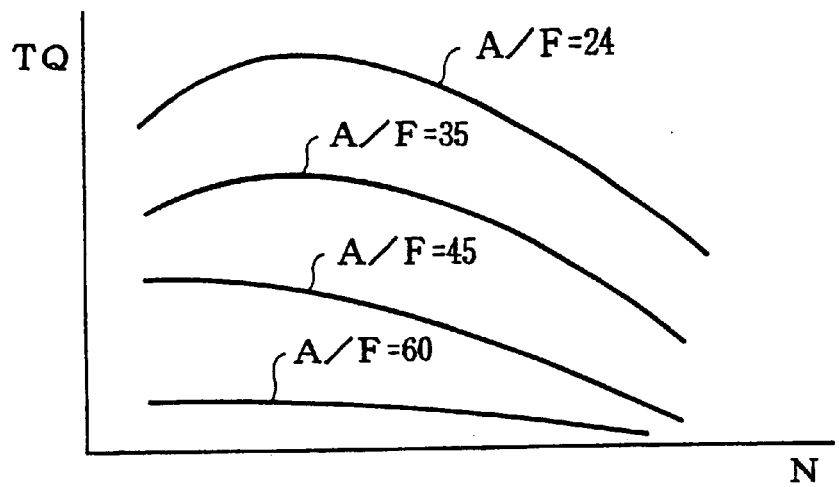
FIG. 14 is a graph showing an air fuel ratio in a second combustion.

FIG. 14 is a graph showing a target air fuel ratio during the second combustion, that is, the combustion in accordance with the conventional combustion method is performed. Curves indicated by A/F=24, A/F=35, A/F=45 and A/F=60 show states having target air fuel ratios 24, 35, 45 and 60, respectively. A target opening degree ST of the throttle valve 20 necessary for setting the air fuel ratio to the target air fuel ratio has been previously stored within the ROM 42 as a function of the required torque TQ and the engine speed N in the form of a map as shown in FIG. 13A. A target opening degree SE of the EGR control valve 31 necessary for setting the air fuel ratio to the target air fuel ratio has been previously stored within the ROM 42 as a function of the required torque TQ and the engine speed N in one form of a map, as shown in FIG. 13B. Further, the fuel injection pressure in the second operation area II, that is, a target fuel pressure P within the common rail 34 is also previously stored within the ROM 42 in the form of a map, as shown in FIG. 13C.

The catalyst 25 performs a good oxidation function only when the catalyst 25 reaches an activation temperature corresponding to the kind of catalyst used, for example, when the activation temperature is higher than 350° C. Accordingly, in order to properly oxidize the unburned hydrocarbon HC and the like contained in the exhaust gas, it is necessary to hold the temperature of the catalyst 25 to a temperature equal to or greater than the activation temperature, for example, 350° C.

However, during the idling operation of the engine, the amount of fuel injection is reduced and the calorific power is small, such that the temperature of the exhaust gas decreases. Therefore, when the engine is left in the idling operation state for a long time, the temperature of the catalyst 25 is lowered to the temperature equal to or less than the activation temperature. Thus, when the temperature of the catalyst 25 is equal to or less than a lower limit temperature, which is slightly higher than the activation temperature during the idling operation of the engine, the temperature of the catalyst 25 is increased so that the temperature of the catalyst 25 does not become equal to or less than the activation temperature.

Next, a description will be given of the idling operation control.

The idling operation is performed in the low temperature combustion, wherein, the throttle valve 20 and the EGR control valve 31 are closed near to the full close state as mentioned above. During the idling operation, control is performed such that the idling engine speed N becomes a target idling engine speed tN, and a control of the idling engine speed is performed by controlling the opening degree of the throttle valve 20, that is, controlling the intake air amount.

A mass flow amount Ga of the actual intake air admitted into the combustion chamber 5, hereinafter referred to as a suction air amount Ga, is detected by the mass flow amount detecting device 49. During the idling operation, the fuel injection amount Q required for setting the air fuel ratio to the target air fuel ratio A/F can be calculated on the basis of the suction air amount Ga and the target air fuel ratio A/F during the idling operation. Accordingly, during the idling operation, when the intake air amount is increased so as to increase the engine speed, the fuel injection amount Q is increased, and when the intake air amount is reduced to lower the engine speed, the fuel injection amount Q is also reduced.

Further, during the idling operation, the EGR rate is controlled on the basis of the pressure PM within the intake passage disposed downstream the throttle valve 20 so as to become the target EGR rate during the idling operation. That is, when the suction air amount Ga and the EGR gas amount are defined, the pressure PM within the intake passage disposed downstream the throttle valve 20 is also defined. While performing the idling operation, the suction air amount Ga is substantially constant. Accordingly, if the EGR gas amount has become the target amount, that is, the EGR rate has become the target EGR rate, the pressure PM within the intake passage disposed downstream the throttle valve 20 becomes a certain fixed pressure. Accordingly, when controlling the EGR amount so that the pressure PM within the intake passage disposed downstream the throttle valve 20 becomes the predetermined fixed pressure, the EGR rate becomes the target EGR rate.

Accordingly, the EGR rate becomes the target EGR rate by previously storing the predetermined fixed pressure within the intake passage as a target pressure PMO and controlling the opening degree of the EGR control valve 31 so that the pressure PM within the intake passage disposed downstream the throttle valve 20 becomes the target pressure PMO.

Next, description will be given with respect to preventing the temperature of the catalyst 25 from lowering to the temperature equal to or less than the activation temperature while performing the idling operation with reference to a fuel injection time line shown in FIG. 15.

During the idling operation, generally, fuel injection is performed prior to the compression top dead center. The fuel injection is represented by reference symbol Q' in FIG. 15. When a temperature Tc of the catalyst 25 becomes lower than a lower limit temperature $T_{min}$, which is higher than the activation temperature, the injection timing $\Delta\theta S$ is delayed so that the fuel injection is performed at Q in FIG. 15, that is, after compression top dead center.

Figure 15:
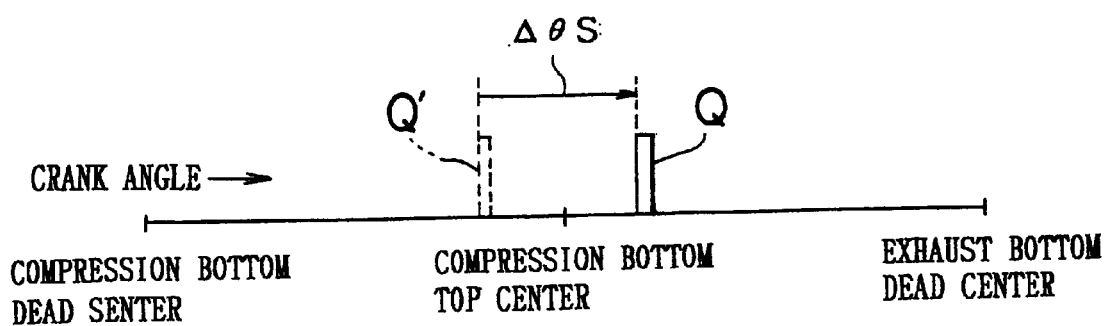
FIG. 15 is a fuel injection timing chart.

When the injection timing is delayed, as shown by Q in FIG. 15, the output of the engine is lowered and the engine speed N is lowered. When the engine speed N is lowered, the intake air amount is increased so as to increase the engine speed N to the target idling engine speed $N_0$, and the fuel injection amount Q is accordingly increased. When the fuel injection amount Q is increased, the temperature of the exhaust gas is increased, and the temperature Tc of the catalyst 25 is increased. Accordingly, it is possible to prevent the temperature Tc of the catalyst 25 from lowering to the temperature equal to or less than the activation temperature.

Figure 16:
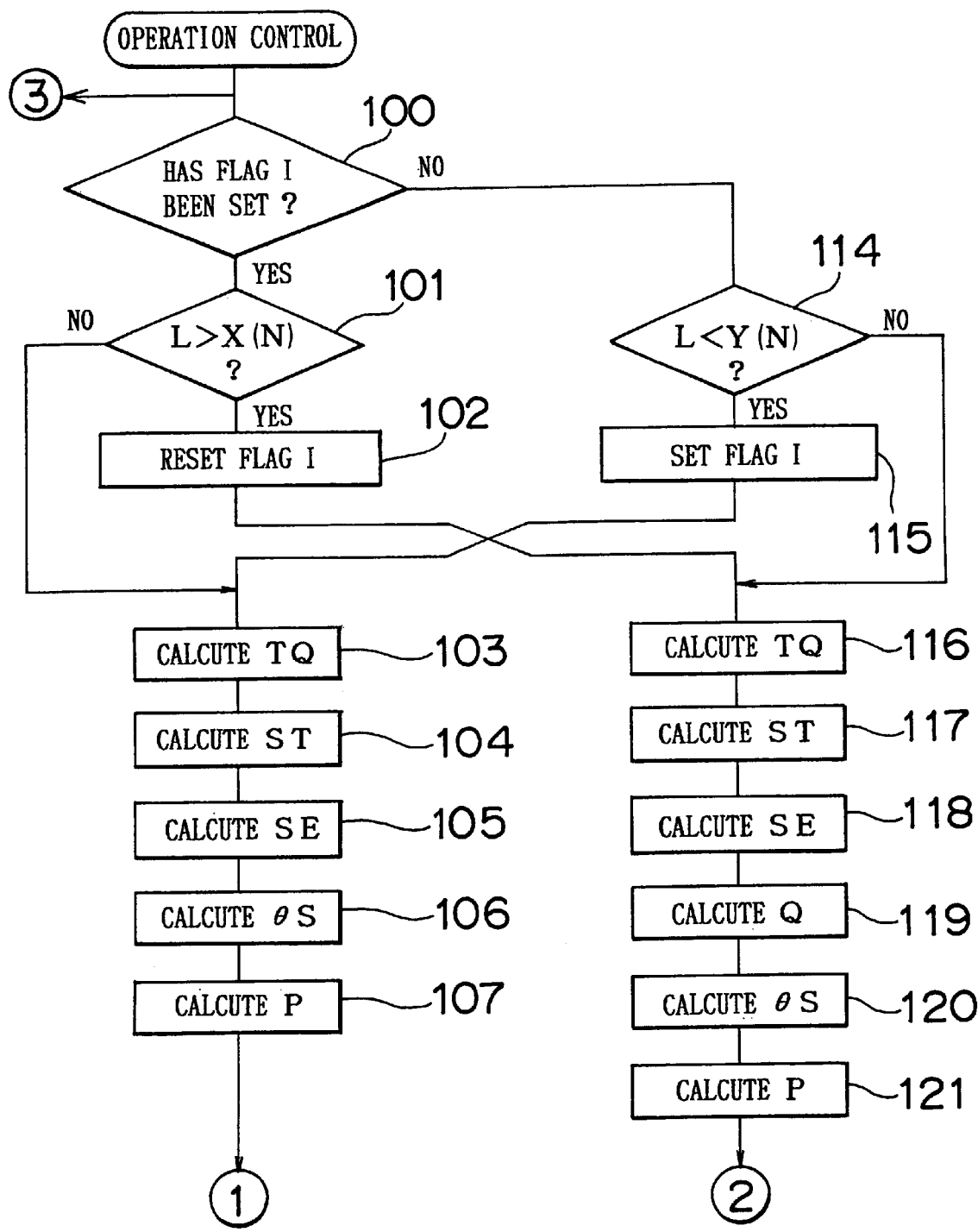
FIGS. 16 and 17 are flow charts for controlling operation of the engine.

Next, description will be given with respect to controlling operation of the engine with reference to FIGS. 16 and 17.

At first, in step 100, it is determined whether a flag I is showing that the operation area of the engine is set in the first operation area I. When the flag I is set, that is, the operation area of the engine is in the first operation area I, the process goes to step 101 where it is determined whether the required load L becomes greater than the first boundary X1 (N). When a relationship L≦X1 (N) is established, the process goes to step 103 where the low temperature combustion is performed.

That is, instep 103, the required torque TQ is calculated from the map shown in FIG. 10B. Then, in step 104, the target opening degree ST of the throttle valve 20 is calculated from the map shown in FIG. 13A. Next, in step 105, the target opening degree SE of the EGR control valve 31 is calculated from the map shown in FIG. 13B. Then, in step 106, the injection start timing θS is calculated from the map shown in FIG. 12B. Next, in step 107, the target fuel pressure within the common rail 34, that is, the injection pressure P is calculated from the map shown in FIG. 13C.

Figure 17:
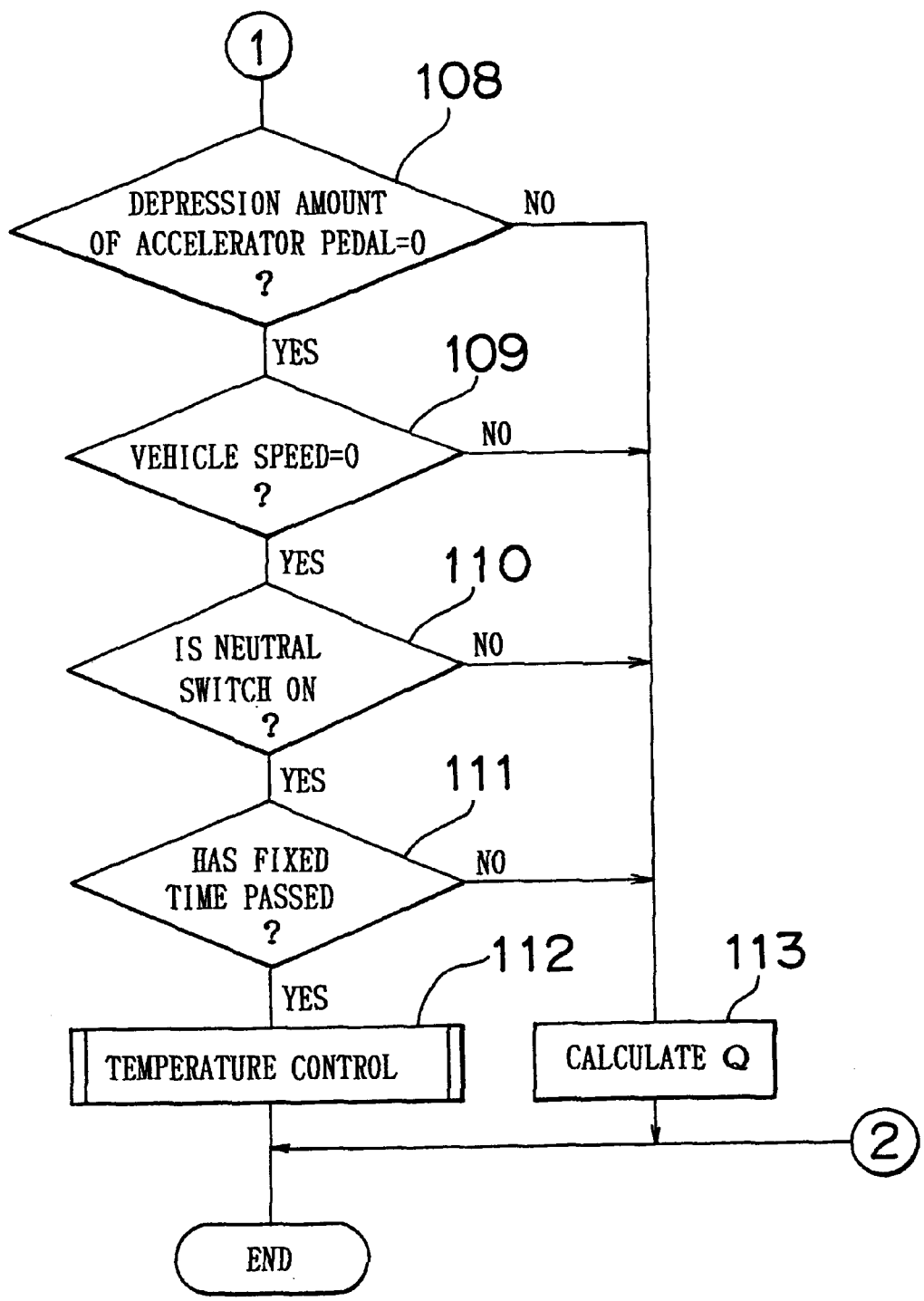

Then, looking at FIG. 17 in step 108, it is determined whether the depression amount of the accelerator pedal 50 is zero. When the depression amount of the accelerator pedal 50 is zero, the process goes to step 109 where it is determined on the basis of the output pulse of the vehicle speed sensor 53 whether the vehicle speed is zero. When the vehicle speed is zero, the process goes to step 110 where it is determined on the basis of the output signal of the neutral switch 54 whether the automatic transmission 38 is in the neutral position. When the automatic transmission 38 is in the neutral position, the process goes to step 111 where it is determined whether a fixed time has passed after the automatic transmission 38 is in the neutral position, and when the fixed time has passed, it is determined that the idling operation state is performed.

When it is determined that the idling operation state is performed, the process goes to step 112 and temperature control of the catalyst 25 is performed. Here, a temperature control routine is executed among the nine temperature controls shown in FIGS. 18, 20–24 and 26–28. In any one of steps 108 to 111, when the determination is "NO", that is, the engine is not in an idling operation state, the process goes to step 113 where the injection amount Q is calculated on the basis of the map shown in FIG. 12A.

In step 101, when it is determined that the relationship L>X(N) is established, the process goes to step 102 where the flag I is reset, and then, the process goes to step 116 where the second combustion is performed.

That is, instep 116, the required torque TQ is calculated from the map shown in FIG. 10B. Then, in step 117, the target opening degree ST of the throttle valve 20 is calculated from the map shown in FIG. 13A. Next, in step 118, the target opening degree SE of the EGR control valve 31 is calculated from the map shown in FIG. 13B. Then, in step 119, the injection amount Q is calculated from the map shown in FIG. 12A. Next, in step 120, the injection start timing θS is calculated from the map shown in FIG. 12B. Then, in step 121, the target fuel pressure within the common rail 34, that is, the injection pressure P is calculated from the map shown in FIG. 13C.

When the flag I is reset, in the next process cycle, the process goes to step 114 from step 100 and it is determined whether the required load L becomes lower than the second boundary Y(N). When the relationship L≧Y(N) is established, the process goes to step 116 where the second combustion is performed. Contrarily, in step 114, when it is determined that the relationship L<Y(N) is established, the process goes to step 115 where the flag I is set, and the process then goes to step 103 where the low temperature combustion is performed.

Figure 18:
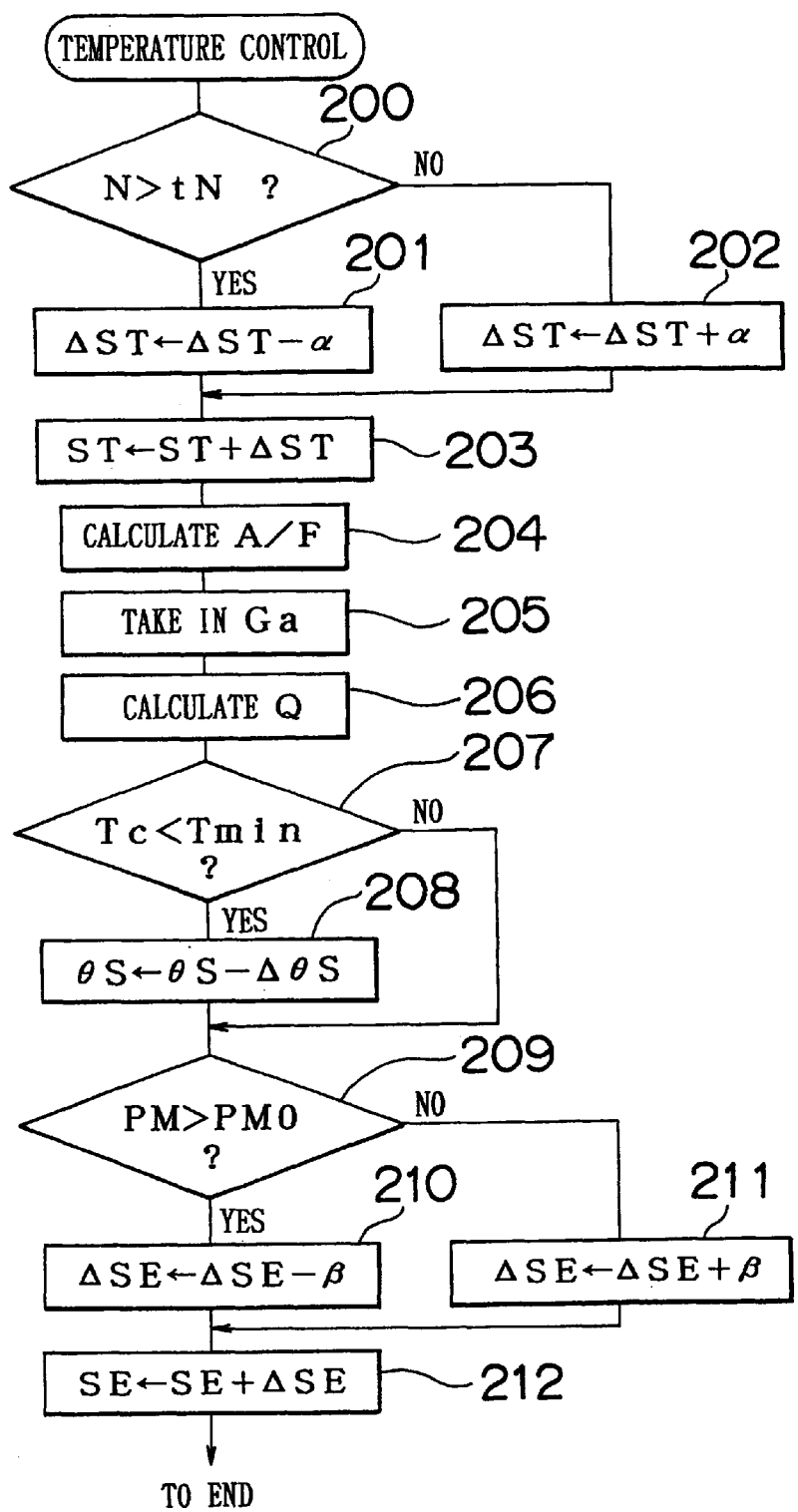
FIG. 18 is a flow chart for executing a first temperature control.

Next, the first temperature control performed in step 112 in FIG. 17 will be described below with reference to the flow chart of FIG. 18.

At first, in step 200, it is determined whether the engine speed N is higher than the target idling engine speed tN. When the relationship N>tN is established, the process goes to step 201 where a fixed value α is subtracted from the correction value ΔST with respect to the opening degree of the throttle valve 20, and the process goes to step 203. Contrarily, when the relationship N≦tN is established, the process goes to step 202 where the fixed value α is added to the correction value ΔST. Then, in step 203, the final opening degree ST of the throttle valve 20 is calculated by adding the correction value ΔST to the target opening degree ST of the throttle valve 20.

Next, in step 204, the target air fuel ratio A/F is calculated. Then, in step 205, the suction air amount Ga detected by the mass flow amount detecting device 49 is measured. Next, in step 206, the fuel injection amount Q required for setting the air fuel ratio to the target air fuel ratio A/F is calculated on the basis of the target air fuel ratio A/F and the suction air amount Ga.

That is, when the relationship N>tN is established, the suction air amount Ga is reduced since the opening degree ST of the throttle valve 20 is reduced. When the suction air amount Ga is reduced, the fuel injection amount Q is reduced such that the engine speed N is lowered. Contrarily, when the relationship N≦tN is established, the suction air amount Ga is increased as the opening degree ST of the throttle valve 20 is increased. When the suction air amount Ga is increased, the fuel injection amount Q is also increased, such that the engine speed N is increased. As mentioned above, the engine speed N is controlled by the target idling engine speed tN.

Then, in step 207, it is determined whether the temperature Tc of the catalyst 25 detected by the temperature sensor 27 is lower than the lower limit temperature $T_{min}$. When the relationship Tc≧$T_{min}$ is established, the process goes to step 209. Alternatively, when the relationship Tc<$T_{min}$ is established, the process goes to step 208 where the injection start timing θS is delayed a predetermined value ΔθS, as shown in FIG. 15. As a result, the temperature of the exhaust gas is increased as mentioned above, and the temperature Tc of the catalyst 25 is also increased.

In step 209, it is determined whether the pressure PM within the surge tank 12 detected by the pressure sensor 39 is higher than the target pressure PMO. When the relationship PM>PMO is established, the process goes to step 210 where a fixed value β is subtracted from a correction value ΔSE with respect to the opening degree of the EGR control valve 31, and the process then goes to step 212. Contrarily, when the relationship PM≦PMO is established, the process goes to step 211 where the fixed value β is added to the correction value ΔSE, and the process then goes to step 212. In step 212, the final opening degree SE of the EGR control valve 31 is calculated by adding the correction value ΔSE to the target opening degree SE of the EGR control valve 31.

As mentioned above, the opening degree SE of the EGR control valve 31 is controlled so that the pressure PM of the surge tank 12 becomes the target pressure PMO, and the EGR rate is set to the target EGR rate.

Figure 19:
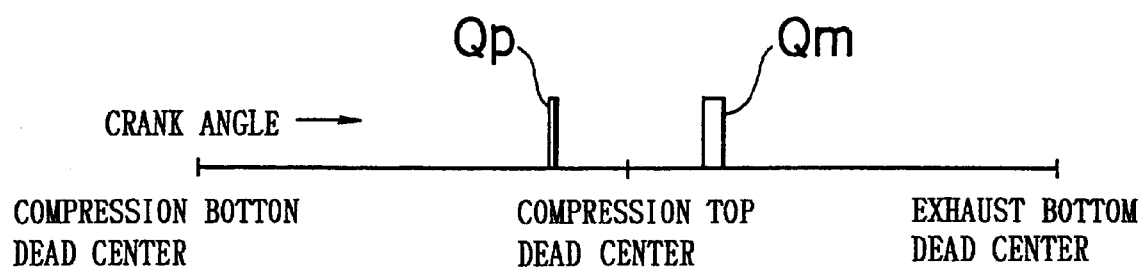
FIG. 19 is a fuel injection timing chart for a second embodiment of temperature control.

Next, a second embodiment of the temperature control performed in step 112 in FIG. 17 will be described below. In this embodiment, when the temperature Tc of the catalyst 25 becomes lower than the lower limit temperature $T_{min}$, as shown in FIG. 19, a pilot injection $Q_p$ is performed before the compression top dead center prior to a main injection $Q_m$. An injection amount of the pilot injection $Q_p$ is small and fixed. Contrarily, the main injection $Q_m$ is performed after the compression top dead center, and when the injection amount Q is increased, an injection amount of the main injection $Q_m$ is increased.

In this case, since the injection timing of the main injection $Q_m$ is delayed, the output of the engine is reduced and the engine speed N is lowered. When the engine speed N is lowered, the suction intake air amount Ga is increased so as to raise the engine speed N to the target idling engine speed $N_0$, and the fuel injection amount Q is then increased. When the fuel injection amount Q is increased, the temperature of the exhaust gas is increased, the temperature Tc of the catalyst 25 is also increased. Accordingly, it is possible to prevent the temperature Tc of the catalyst 25 from decreasing to the activation temperature or less.

Figure 20:
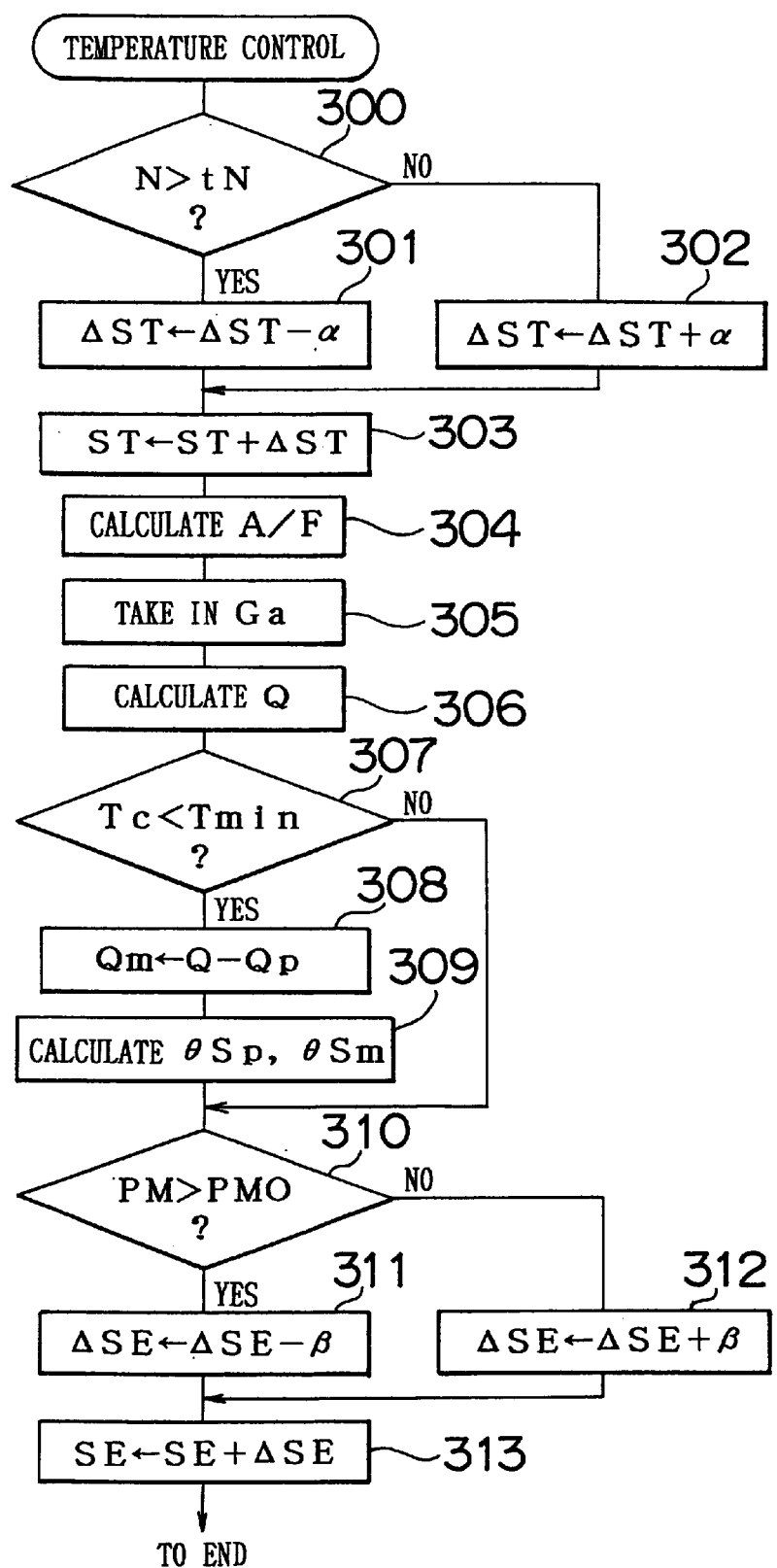
FIG. 20 is a flow chart for executing a second embodiment of temperature control.

Next, a second temperature control routine will be described below with reference to FIG. 20.

Steps 300 to 306 and 310 to 313 are identical to steps 200 to 206 and 209 to 212 in the first temperature control routine discussed above in relation to FIG. 18 and are omitted from discussion to avoid being redundant.

In step 307, it is determined whether the temperature Tc of the catalyst 25 detected by the temperature sensor 27 is lower than the lower limit temperature $T_{min}$. When the relationship Tc≧$T_{min}$ is established, the process jumps to step 310. Alternatively, when the relationship Tc<$T_{min}$ is established, the process goes to step 308 where the main injection amount $Q_m$ is calculated by subtracting a pilot injection amount $Q_p$ from the fuel injection amount Q. Then, in step 309, an injection start timing $\theta S_p$ of the pilot injection and an injection start timing $\theta S_m$ of the main injection are calculated.

Next, a third embodiment of the temperature control performed in step 112 in FIG. 17 will be described below. In this embodiment, when the temperature Tc of the catalyst 25 becomes lower than the lower limit temperature $T_{min}$, the target fuel pressure P within the common rail 34 is decreased by a predetermined value ΔP. When the target fuel pressure within the common rail 34 is lowered, an injection period of the fuel is elongated. When the injection period of the fuel is elongated, the output of the engine is lowered and the engine speed N is lowered. When the engine speed N is lowered, the intake air amount is increased so as to raise the engine speed N to the target idling engine speed $N_0$, and the fuel injection amount Q is accordingly increased. When the fuel injection amount Q is increased, the temperature of the exhaust gas is increased, so that the temperature Tc of the catalyst 25 is increased. Accordingly, it is possible to prevent the temperature Tc of the catalyst 25 from lowering to the activation temperature or less.

Figure 21:
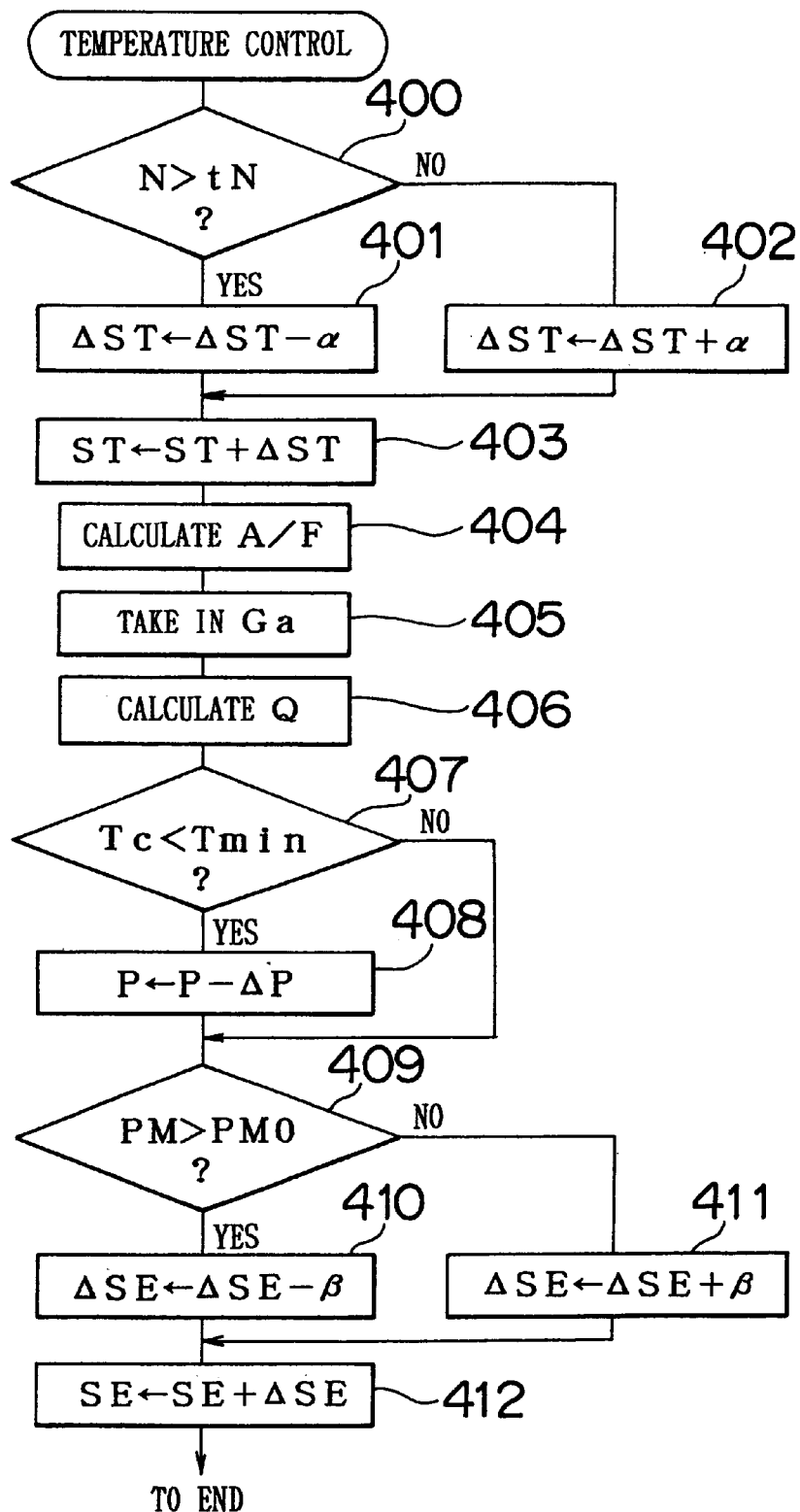
FIG. 21 is a flow chart for executing a third embodiment of temperature control.

With reference to FIG. 21, the control routine of the third temperature control will be described below.

Steps 400 to 406 and 409 to 412 are identical to steps 200 to 206 and 209 to 212 in the first temperature control routine discussed above and are also omitted from discussion to avoid redundancy.

In step 407, it is determined whether the temperature Tc of the catalyst 25 detected by the temperature sensor 27 is lower than the lower limit temperature $T_{min}$. When the relationship Tc≧$T_{min}$ is established, the process jumps to step 310. Alternatively, when the relationship Tc<$T_{min}$ is established, the process goes to step 308 where the final target pressure P is calculated by subtracting a predetermined value ΔP from the target fuel pressure P within the common rail 34. Accordingly, the fuel pressure within the common rail is lowered.

Next, a fourth embodiment of the temperature control performed in step 112 in FIG. 17 will be described below. In this embodiment, when the temperature Tc of the catalyst 25 becomes lower than the lower limit temperature $T_{min}$, the supply amount of the EGR gas is reduced. When the supply amount of the EGR gas is reduced, the pressure within the surge tank 12 is lowered, thereby increasing the pumping loss. When the pumping loss is increased, the output of the engine is lowered, thus lowering the engine speed N. When the engine speed N is lowered, the suction air amount Ga is increased so as to raise the engine speed N to the target idling engine speed $N_0$, and the fuel injection amount Q is increased accordingly. When the fuel injection amount Q is increased, the temperature of the exhaust gas is increased so that the temperature Tc of the catalyst 25 is also increased. Accordingly, it is possible to prevent the temperature Tc of the catalyst 25 from lowering to the activation temperature or less.

In this embodiment, the supply amount of the EGR gas is lowered by the fixed value ΔPM, thereby lowering the target pressure PMO within the surge tank 12. That is, when the target pressure PMO within the surge tank 12 is lowered, the EGR control valve 31 is closed until the pressure PM within the surge tank 12 becomes the target pressure PMO so that the supply amount of the EGR gas is reduced.

Figure 22:
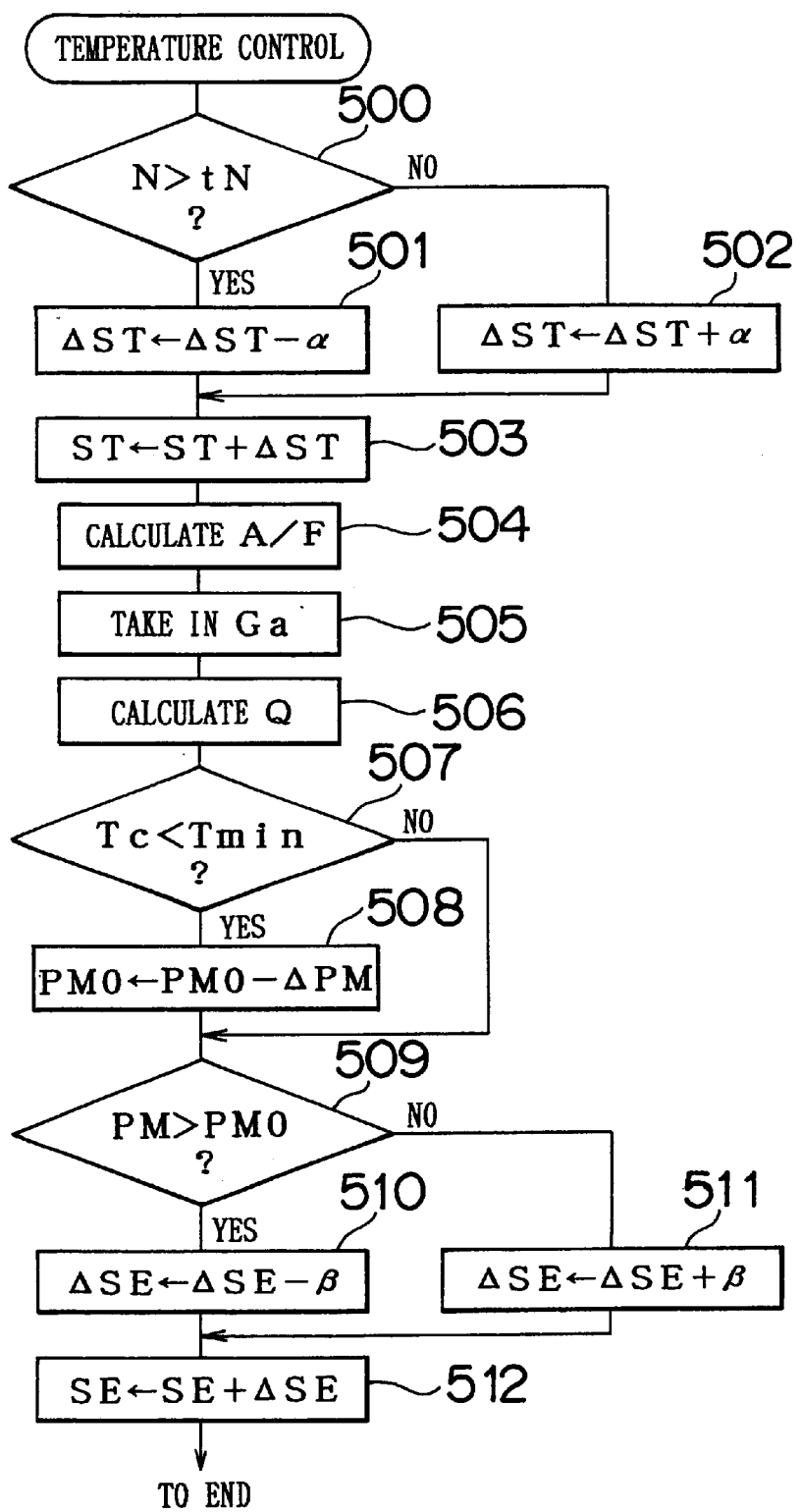
FIG. 22 is a flow chart for executing a fourth embodiment of temperature control.

Next, with reference to FIG. 22, the control routine of the fourth embodiment of temperature control will be described below.

Steps 500 to 506 and 509 to 512 are identical to steps 200 to 206 and 209 to 212 in the first temperature control routine discussed above and are also omitted from discussion to avoid redundancy.

In step 507, it is determined whether the temperature Tc of the catalyst 25 detected by the temperature sensor 27 is lower than the lower limit temperature $T_{min}$. When the relation $Tc \geq T_{min}$ is established, the process jumps to step 509. Alternatively, when the relationship $Tc < T_{min}$ is established, the process goes to step 508 where the final target pressure PMO is calculated by subtracting a fixed value ΔPM from the target pressure PMO within the surge tank 12. As a result, the supply amount of the EGR gas is lowered as mentioned above.

Next, a fifth embodiment of the temperature control performed in step 112 in FIG. 17 will be described below. In this embodiment, when the temperature Tc of the catalyst 25 becomes lower than the lower limit temperature $T_{min}$, the target idling engine speed tN is increased. When the target idling engine speed tN is increased, the suction air amount Ga is increased, and the fuel injection amount Q is increased accordingly. When the fuel injection amount Q is increased, the temperature of the exhaust gas is increased, thus, increasing the temperature Tc of the catalyst 25. Accordingly, it is possible to prevent the temperature Tc of the catalyst 25 from decreasing to the activation temperature or less.

In this embodiment, since the EGR rate is maintained at the target EGR rate even when the suction air amount Ga is increased, the target pressure PMO within the surge tank 12 is increased when the target idling engine speed tN is increased.

Figure 23:
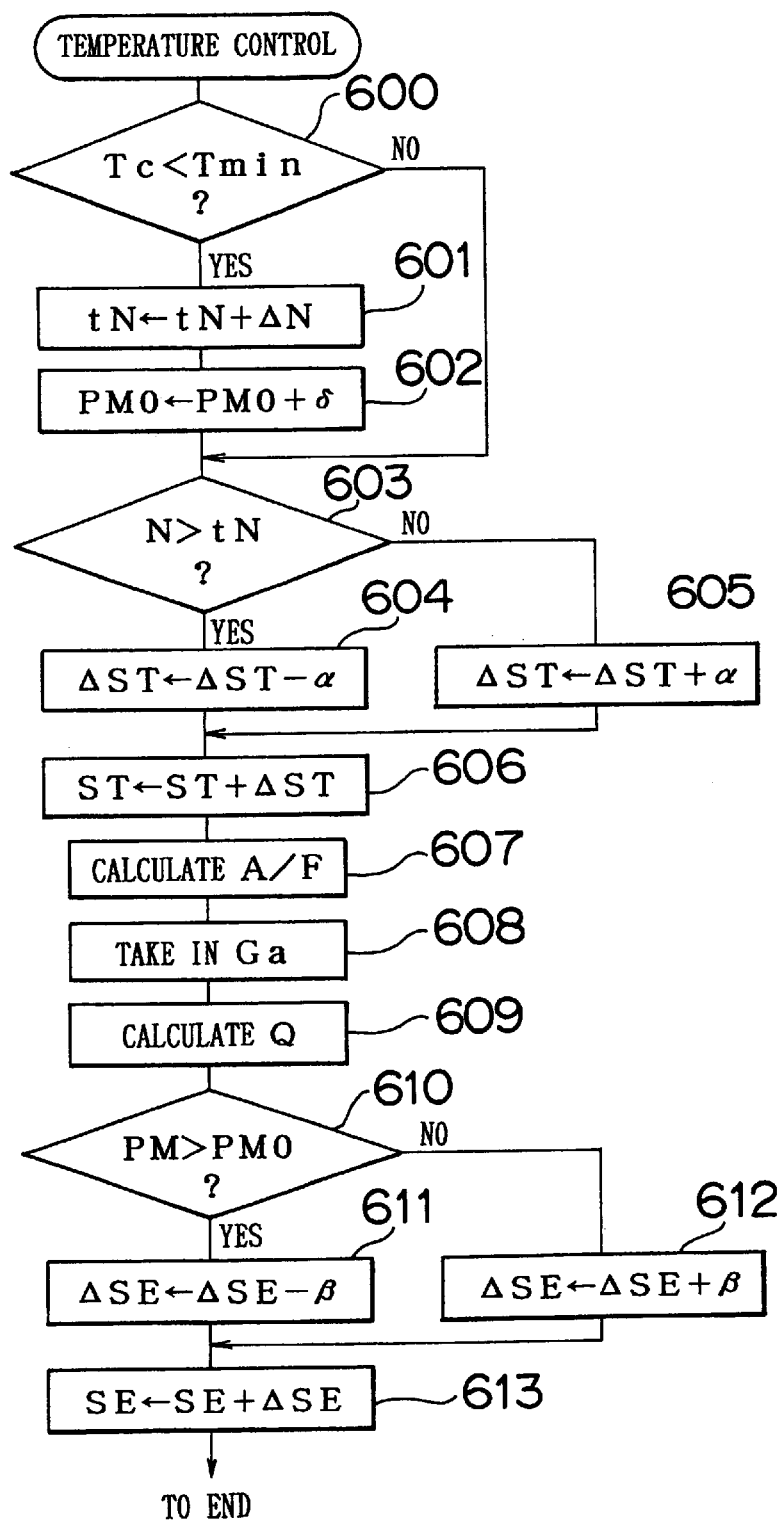
FIG. 23 is a flow chart for executing a fifth embodiment of temperature control.

Next, with referene to FIG. 23, the control routine of the fifth embodiment of temperature control will be described below.

At first, in step 600, it is determined whether the temperature Tc of the catalyst 25 detected by the temperature sensor 27 is lower than the lower limit temperature $T_{min}$. When the relationship $Tc \geq T_{min}$ is established, the process jumps to step 603. Contrarily, when the relationship $Tc < T_{min}$ is established, the process goes to step 601 where a fixed value ΔN is added to the target idling engine speed tN. In other words, the target idling engine speed tN is increased. In step 602, the target pressure PMO within the surge tank 12 is increased by a predetermined value δ to maintain the EGR rate at the target EGR rate.

Steps 603 to 609 and 610 to 613 are identical to steps 200 to 206 and 209 to 212 in the first temperature control routine discussed above and are omitted from discussion to avoid redundancy.

Next, a sixth embodiment of the temperature control performed in step 112 in FIG. 17 will be described below.

In the first operation area I, the low temperature combustion is generally performed at the lean state air fuel ratio. Accordingly, excessive oxygen is contained in the exhaust gas and is absorbed within the catalyst 25. Accordingly, when a large amount of unburned hydrocarbon HC and carbon monoxide CO are discharged from the combustion chamber 5, the unburned hydrocarbon HC and carbon monoxide CO are oxidized by a large amount of oxygen absorbed in the catalyst 25 and the temperature of the catalyst 25 is increased due to an oxidation reaction heat at this time.

Then, in accordance with the sixth embodiment, the air fuel ratio is made rich when the temperature Tc of the catalyst 25 becomes lower than the lower limit temperature $T_{min}$. When the air fuel ratio is made rich, a large amount of unburned hydrocarbon HC and carbon monoxide CO are discharged from the engine and the temperature of the catalyst 25 is increased due to the oxidation reaction heat. As a result, the temperature Tc of the catalyst 25 is prevented from decreasing to the activation temperature or less.

Figure 24:
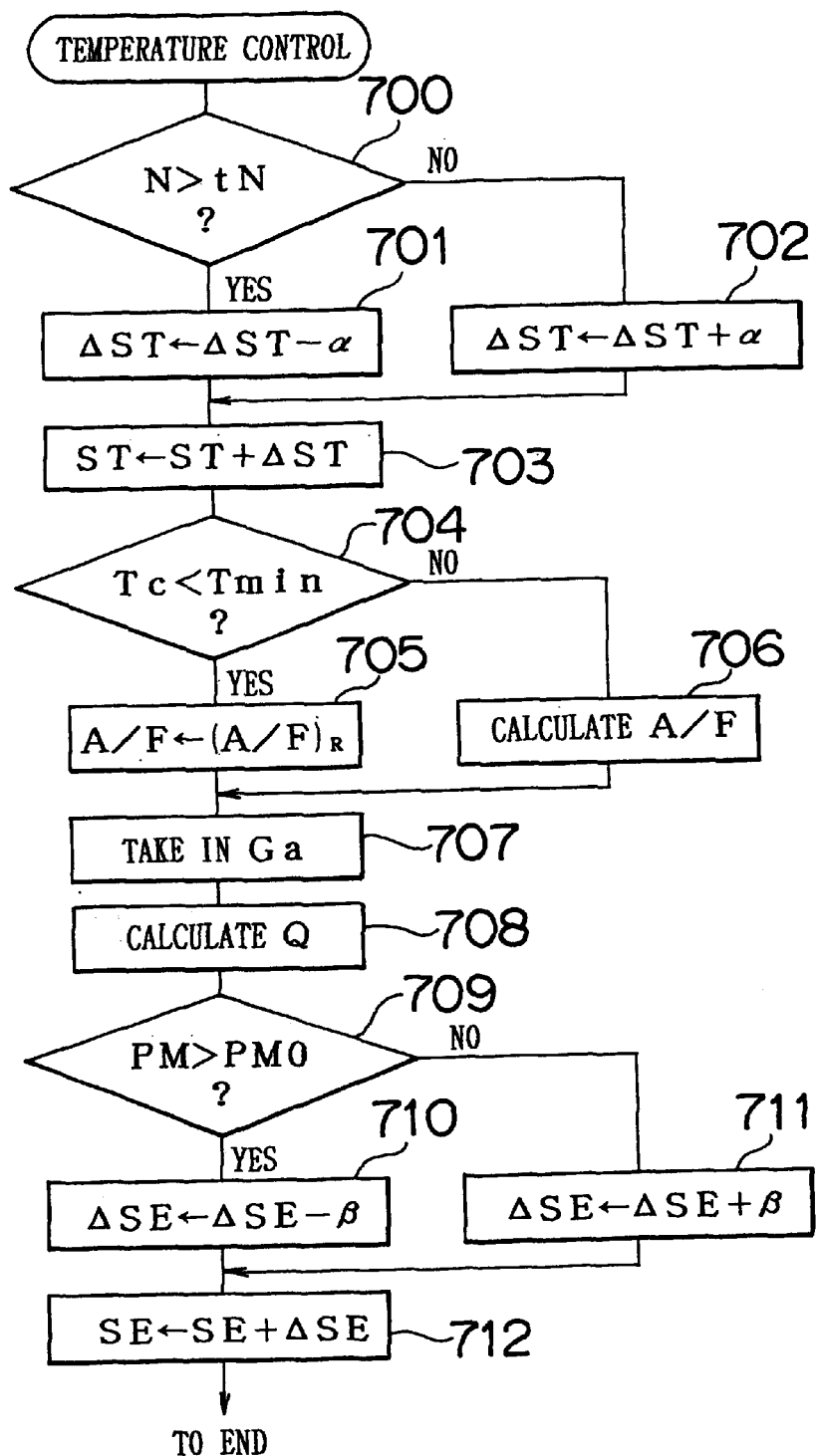
FIG. 24 is a flow chart for executing a sixth embodiment of temperature control.

With reference to FIG. 24, the control routine of the sixth embodiment of temperature control will be described below.

Steps 700 to 703 are identical to steps 200 to 203 in the first temperature control routine discussed above and are omitted from discussion to avoid redundancy.

In step 704, it is determined whether the temperature Tc of the catalyst 25 detected by the temperature sensor 27 is lower than the lower limit temperature $T_{min}$. When the relationship $Tc \geq T_{min}$ is established, the process goes to step 706 where the target air fuel ratio A/F is calculated. The target air fuel ratio A/F calculated is in the lean state. Then, the process goes to step 707. Alternatively, when the relationship $Tc < T_{min}$ is established, the process goes to step 705 where the target air fuel ratio A/F is set to a predetermined rich air fuel ratio $(A/F)_R$.

Steps 707 and 708 and 709 to 712 are the same as steps 205 and 206 and 209 to 212, respectively, in the first temperature control and are omitted from discussion to avoid redundancy.

Figure 25:
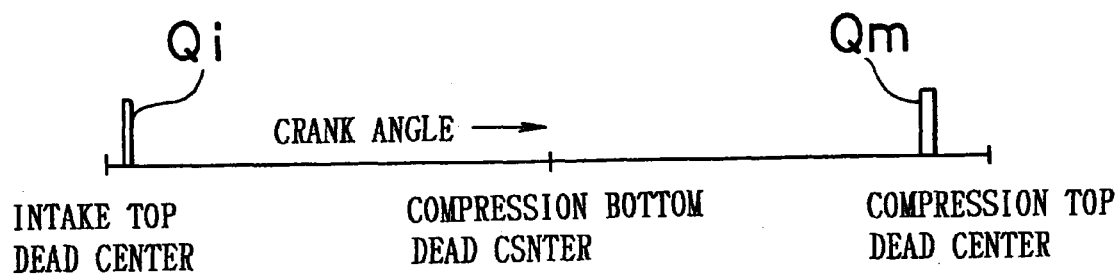
FIG. 25 is a fuel injection timing chart for a seventh embodiment of temperature control.

Next, a seventh embodiment of the temperature control performed in step 112 in FIG. 17 will be described below. In this case, when the temperature Tc of the catalyst 25 becomes lower than the lower limit temperature $T_{min}$, a first fuel injection $Q_i$ is performed at an early stage of the intake stroke, as shown in FIG. 25, and a second fuel injection, that is, a main injection $Q_m$, is performed at an end stage of the compression stroke. In other words, in this case, a so-called VIGOM injection is performed. In FIG. 25, an injection amount of the first fuel injection $Q_i$ is set to be small and fixed, and an injection amount of the main injection $Q_m$, is increased when the fuel injection amount Q is increased.

As shown in FIG. 25, when the first fuel injection $Q_i$ is performed during the intake stroke, the fuel forms a previously mixed gas that expands within the combustion chamber 5. As mentioned above, when the previously mixed gas is formed, an ignition delay is shortened at a time when the main injection $Q_m$ is performed. However, a part of the previously mixed gas is discharged from the engine without being burned. That is, when the VIGOM injection is performed, a large amount of unburned hydrocarbon HC and carbon monoxide CO is discharged from the engine. As a result, the temperature Tc of the catalyst 25 is increased due to oxidation reaction heat so that it is possible to prevent the temperature Tc of the catalyst 25 from lowering to the activation temperature or less.

Figure 26:
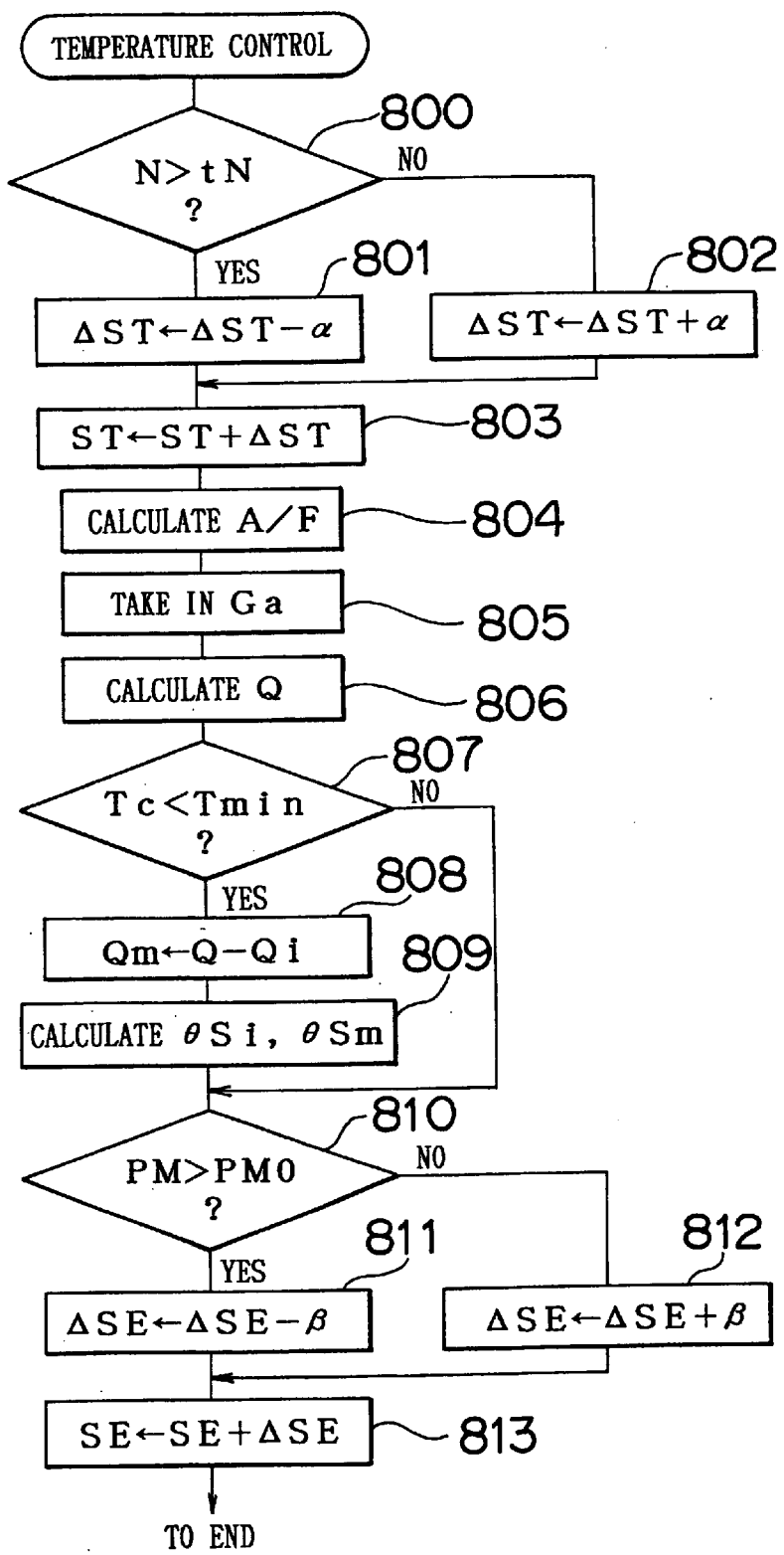
FIG. 26 is a flow chart for executing a seventh embodiment of temperature control.

Next, with reference to FIG. 26, the temperature control routine of the seventh embodiment of temperature control will be described below.

Steps 800 to 806 and 810 to 813 are identical to steps 200 to 206 and 209 to 212 and are omitted from discussion to avoid redundancy.

In step 807, it is determined whether the temperature Tc of the catalyst 25 detected by the temperature sensor 27 is lower than the lower limit temperature $T_{min}$. When the relationship $Tc \geq T_{min}$ is established, the process jumps to step 810. Alternatively, when the relationship $Tc < T_{min}$ is established, the process goes to step 808 where the main injection amount $Q_m$ is calculated by subtracting a predetermined first time fuel injection amount $Q_i$ from the fuel injection amount Q. Then, an injection start timing $\theta S_i$ of the first time injection $Q_i$ and an injection start timing $\theta S_m$ of the main injection $Q_m$ are calculated in step 809.

Next, an eighth embodiment of the temperature control performed in step 112 in FIG. 17 will be described below. When the temperature Tc of the catalyst 25 becomes lower than the lower limit temperature $T_{min}$, for example, the air fuel ratio A/F is made substantially rich only at the first fuel injection time. That is, a large amount of unburned hydrocarbon HC and carbon monoxide CO is fed to the catalyst 25 at a stroke so as to rapidly increase the temperature of the catalyst 25 due to the oxidation reaction heat at this time.

Figure 27:
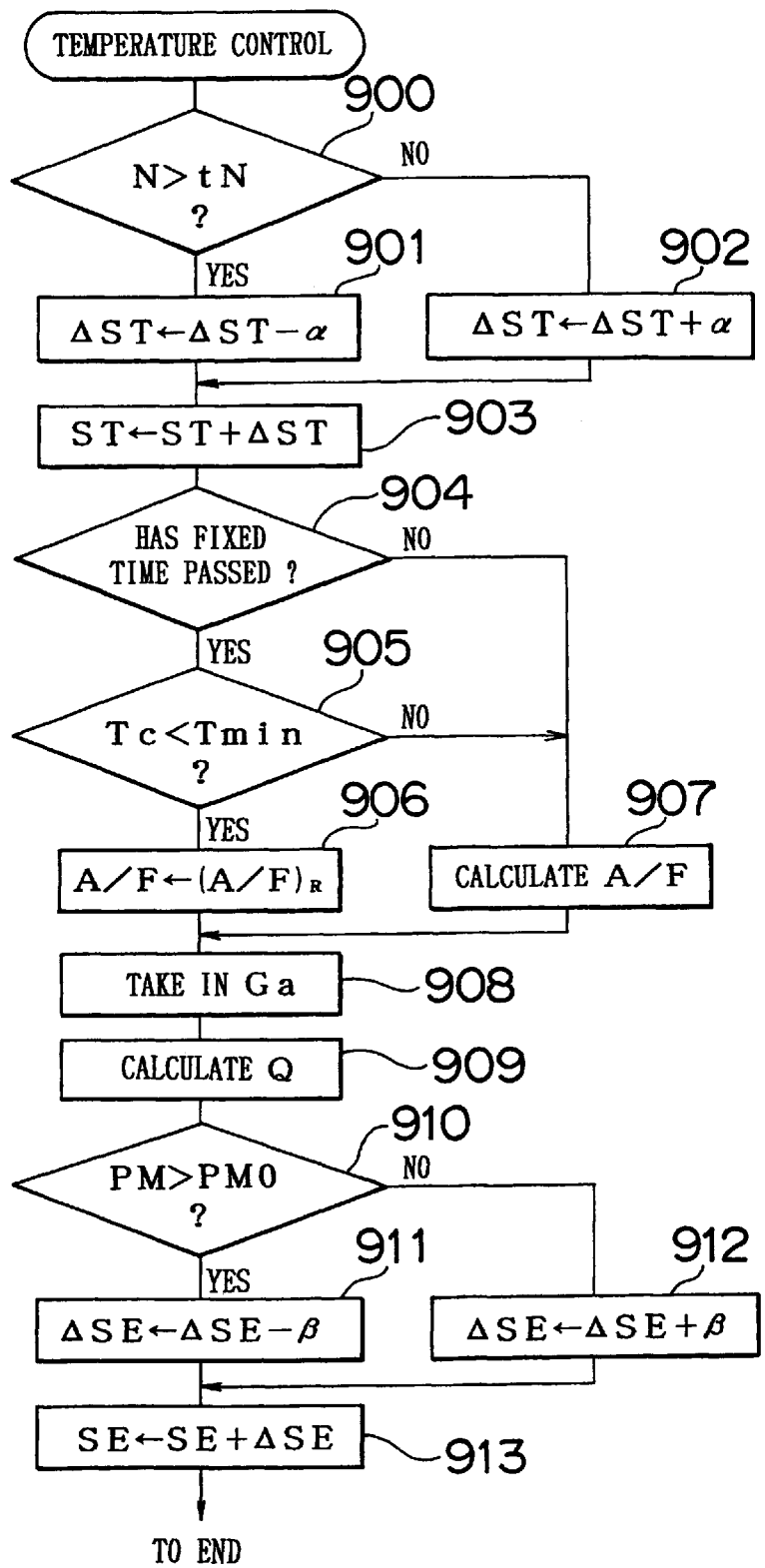
FIG. 27 is a flow chart for executing an eighth embodiment of temperature control.

Next, with reference to FIG. 27, the temperature control routine of the eighth embodiment of temperature control will be described below.

Steps 900 to 903 and 908 to 909 are the same as steps 200 to 203 and 209 to 212 and are omitted from discussion to avoid redundancy.

Next, in step 904, it is determined whether a fixed time has passed after the air fuel ratio A/F is made substantially rich only at one fuel injection time. When the fixed time has passed, the process goes to step 905 where it is determined whether the temperature Tc of the catalyst 25 detected by the temperature sensor 27 is lower than the lower limit temperature $T_{min}$. When the relationship $Tc \geq T_{min}$ is established, the process goes to step 907 where the target air fuel ratio A/F is calculated. The target air fuel ratio A/F calculated at this time becomes lean. Then, the process goes to step 908. Alternatively, when the relationship $Tc < T_{min}$ is established, the process goes to step 906 where the target air fuel ratio A/F is set to a predetermined, substantially rich, air fuel ratio $(A/F)_R$. At this time, the air fuel ratio A/F is made substantially rich only at one injection time. The process skips from step 904 to step 907 before the fixed time has passed thereafter, and the air fuel ratio A/F is made lean.

Next, a ninth embodiment of the temperature control performed in step 112 in FIG. 17 will be described below. When the temperature Tc of the catalyst 25 becomes lower than the lower limit temperature $T_{min}$, for example, an additional fuel $Q_{add}$ is injected only at one fuel injection time during a rear half of the expansion stroke or the exhaust stroke. The additional fuel $Q_{add}$ is discharged from the engine without being burned. Accordingly, a large amount of unburned hydrocarbon HC and carbon monoxide CO is fed to the catalyst 25 at a stroke so as to rapidly increase the temperature of the catalyst 25 due to the oxidation reaction heat at this time.

Figure 28:
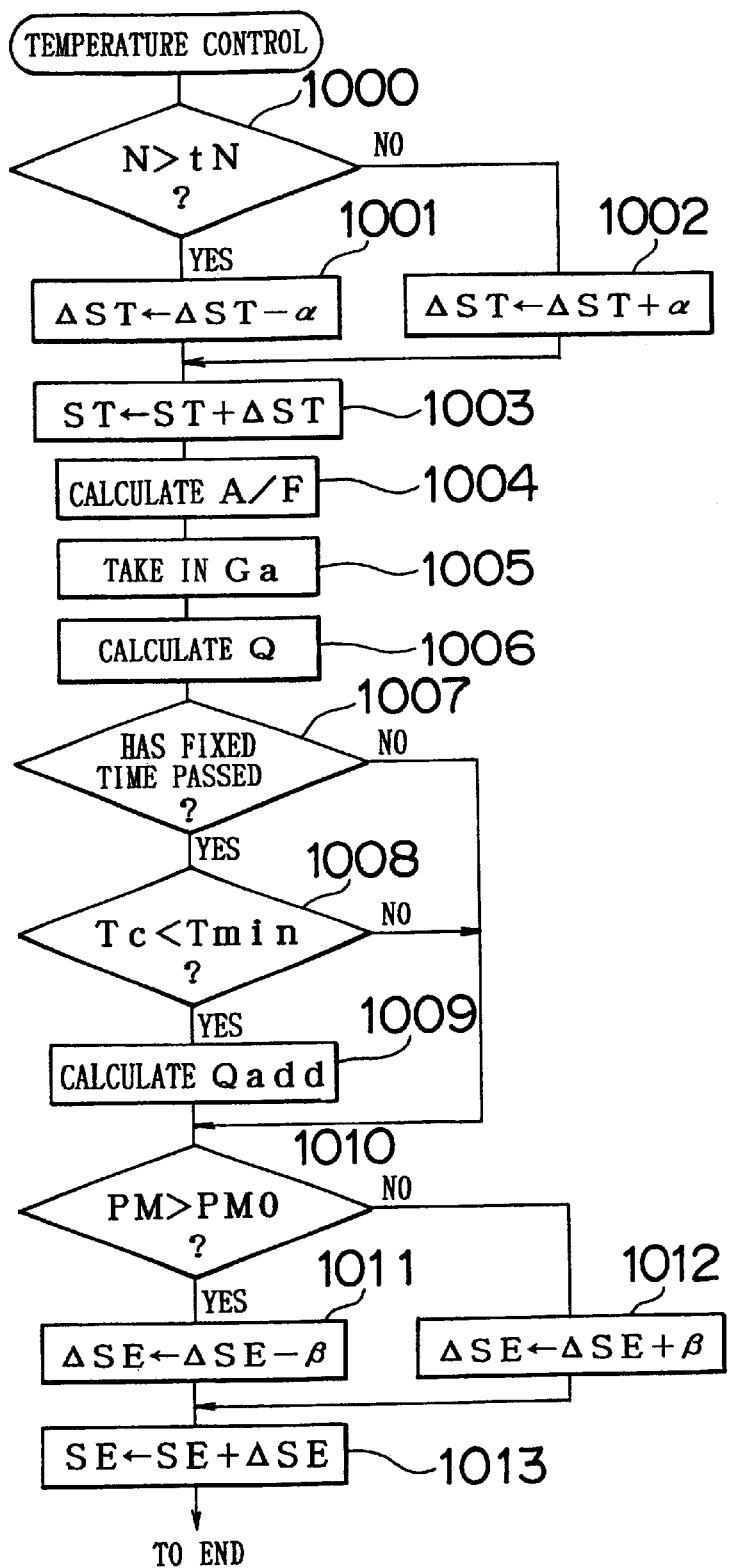
FIG. 28 is a flow chart for executing a ninth embodiment of temperature control.

Next, with reference to FIG. 28, the temperature control routine of the ninth embodiment of temperature control will be described below.

Steps 1000 to 1006 and 1010 to 1013 are the same as steps 200 to 206 and 209 to 212 and are omitted from discussion to avoid redundancy.

In step 1007, it is determined whether a fixed time has passed after the additional fuel $Q_{add}$ is injected only at one fuel injection time. When the fixed time has passed, the process goes to step 1008 where it is determined whether the temperature Tc of the catalyst 25 detected by the temperature sensor 27 is lower than the lower limit temperature $T_{min}$. When the relationship $Tc \geq T_{min}$ is established, the process jumps to step 1010. Alternatively, the relationship $Tc < T_{min}$ is established, the process goes to step 1009 where the additional fuel amount $Q_{add}$ is calculated. At this time, the additional fuel $Q_{add}$ is injected only at one injection time. The process skips from step 1007 to step 1010 before the fixed time has passed, and the additional fuel $Q_{add}$ is not injected during this time.

Figure 29:
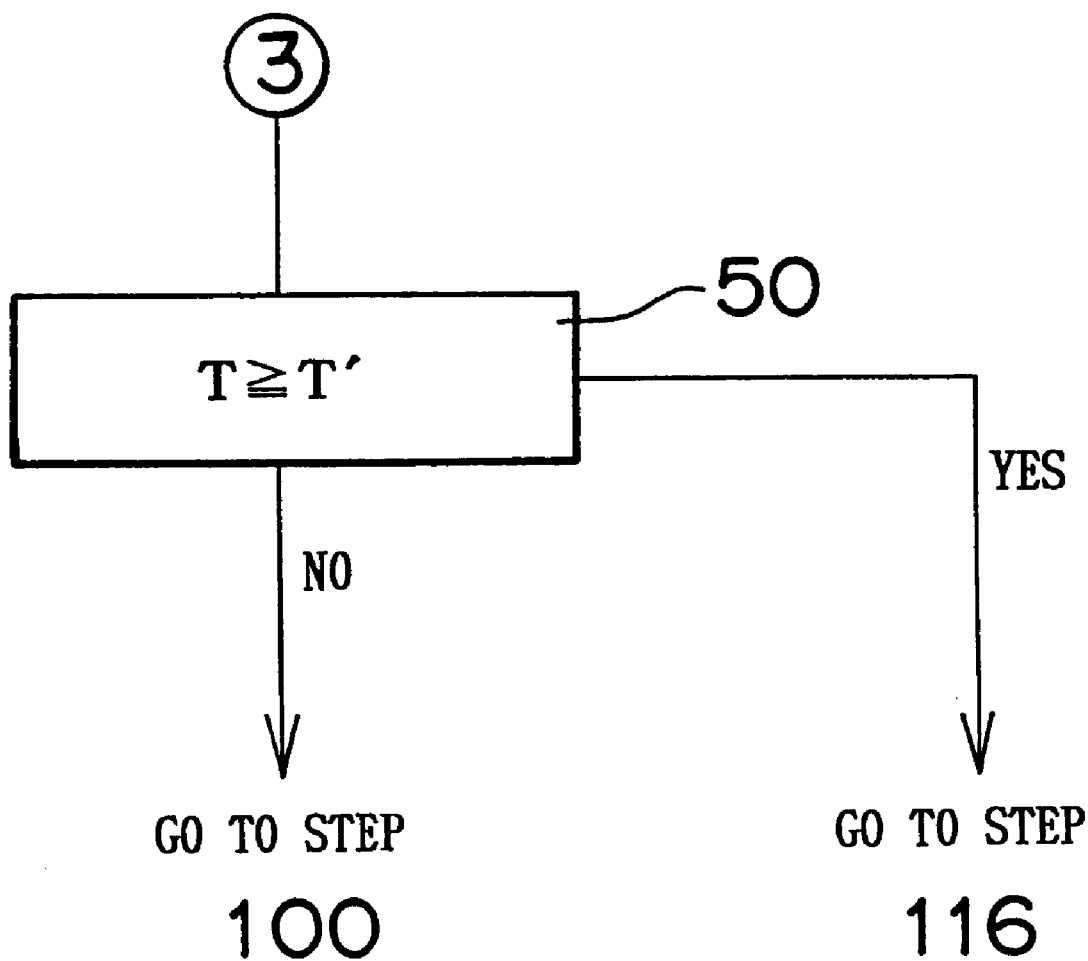
FIG. 29 is a flow chart for determining a temperature of the catalyst.

As shown in FIG. 29, prior to step 100, it is determined whether the temperature T of the catalyst 25 is equal to or more than a predetermined temperature T' during step 50. The process goes to step 100 when NO (T<T') is established, and the process goes to step 116 when YES (T≧T') is established. Accordingly, where it is determined that the temperature T of the catalyst 25 is equal to or more than the predetermined temperature T', execution of the first combustion, the low temperature combustion is inhibited. Accordingly, it is possible to prevent the temperature of the catalyst 25 from excessively increasing and within a proper temperature range.

Further, in the case where the first combustion, the low temperature combustion is performed, when the temperature T of the catalyst 25 is equal to or more than the predetermined temperature T', execution of the fuel cut from the fuel injection valve 6 into the combustion chamber 5 may be inhibited. Accordingly, it is possible to prevent the intake air from being discharged within the exhaust pipe 24 without being used for combustion within the combustion chamber 5. Thus, the intake air and the unburned hydrocarbon discharged within the exhaust pipe 24 are not post-burned within the exhaust pipe 24. Therefore, it is possible to prevent the temperature of the catalyst 25 arranged within the exhaust pipe 24 from abnormally increasing, so that it is possible to keep the temperature of the catalyst 25 within a proper temperature range.

In this case, in place of executing the fuel cut, it is possible to decrease the size of the first operation area I which can execute the first combustion as the temperature T of the catalyst 25 becomes higher. In this case, since the first combustion cannot be performed when the temperature T of the catalyst 25 is high, it is possible to prevent the temperature of the catalyst 25 from excessively increasing.

Further, in order to save the fuel, there is a case in which the fuel cut from the fuel injection valve 6 to the combustion chamber 5 is executed when the vehicle is under the speed reduction operation. However, there is a possibility that cold intake air is discharged within the discharge pipe 24 after passing through the combustion chamber 5 without affecting the combustion. When the temperature of the catalyst 25 arranged within the exhaust pipe 24 is lowered due to the cold intake air, the oxidation function of the catalyst 25 is lowered in correspondence to the reduction of the temperature of the catalyst 25. Then, it is possible to control the opening degree of the throttle valve 20 together with the fuel cut so as to close the throttle valve 20. Accordingly, it is possible to prevent the temperature of the catalyst 25 from decreasing due to the cold air after passing through the combustion chamber 5 without affecting the combustion. As a result, it is possible to keep the temperature of the catalyst 25 within the proper temperature range.

In the illustrated embodiment, the engine controller (ECU) 40 is implemented as a programmed general purpose computer. It will be appreciated by those skilled in the art that the controller can be implemented using a single special purpose integrated circuit, e.g., ASIC, having a main or central processor section for overall, system-level control, and separate sections dedicated to performing various different specific computations, functions and other processes under control of the central processor section. The controller also can be a plurality of separate dedicated or programmable integrated or other electronic circuits or devices, e.g., hardwired electronic or logic circuits such as discrete element circuits, or programmable logic devices such as PLDs, PLSs, PALs or the like. The controller 40 can be implemented using a suitably programmed general purpose computer, e.g., a microprocessor, microcontroller or other processor device (CPU or MPU), either alone or in conjunction with one or more peripheral, e.g., integrated circuit, data and signal processing devices. In general, any device or assembly of devices on which a finite state machine capable of implementing the flowcharts shown in FIGS. 16–18, 20–24 and/or FIGS. 26–29 can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An internal combustion engine having an exhaust passage and a combustion chamber, the engine gradually increases a generated amount of soot to a peak amount by increasing an amount of inert gas supplied to the combustion chamber, comprising:
    an inert gas amount controller that controls the amount of inert gas supplied to the combustion chamber so that the supplied amount is more than an amount of the inert gas that causes generation of the soot to reach the peak amount;
    a catalyst provided in the exhaust passage of the engine, the catalyst performing an oxidation function;
    a detector that detects a temperature of the catalyst; and
    a catalyst temperature adjuster that adjusts the temperature of the catalyst so that the catalyst temperature is within a predetermined temperature range.

2. An internal combustion engine according to claim 1, wherein the catalyst temperature adjuster increases the catalyst temperature by increasing the temperature of an exhaust gas when the catalyst temperature is equal to or less than a lower limit of the predetermined temperature range during an engine idling operation.

3. An internal combustion engine according to claim 2, wherein the catalyst temperature adjuster increases the catalyst temperature by delaying a fuel injection timing when the catalyst temperature is equal to or less than the lower limit of the predetermined temperature range during the engine idling operation.

4. An internal combustion engine according to claim 2, wherein the catalyst temperature adjuster increases the catalyst temperature by performing a pilot injection and setting an injection timing of a main injection after a compression top dead center when the catalyst temperature is equal to or less than the lower limit of the predetermined temperature range during the engine idling operation.

5. An internal combustion engine according to claim 2, wherein the catalyst temperature adjuster increases the catalyst temperature by reducing a fuel injection pressure when the catalyst temperature is equal to or less than the lower limit of the predetermined temperature range during the engine idling operation.

6. An internal combustion engine according to claim 2, further comprising an exhaust gas recirculator that recirculates the exhaust gas discharged from the combustion chamber into an engine intake passage, wherein the inert gas is a recirculation exhaust gas recirculated into the engine intake passage, and the catalyst temperature adjuster increases the catalyst temperature by reducing an amount of the recirculation exhaust gas when the catalyst temperature is equal to or less than the lower limit of the predetermined temperature range during the engine idling operation.

7. An internal combustion engine according to claim 2, wherein the catalyst temperature adjuster increases the catalyst temperature by increasing an idling engine speed when the catalyst temperature is equal to or less than the lower limit of the predetermined temperature range during the engine idling operation.

8. An internal combustion engine according to claim 1, wherein the catalyst temperature adjuster increases the catalyst temperature by increasing an amount of unburned hydrocarbon and carbon monoxide discharged into the engine exhaust passage when the catalyst temperature is equal to or less than a lower limit of the predetermined temperature range at a time of an engine idling operation.

9. An internal combustion engine according to claim 8, wherein the catalyst temperature adjuster increases the catalyst temperature by making an air fuel ratio rich when the catalyst temperature is equal to or less than the lower limit of the predetermined temperature range during the engine idling operation.

10. An internal combustion engine according to claim 8, wherein the catalyst temperature adjuster increases the catalyst temperature by separately performing two strokes of a fuel injection, the two strokes including an intake stroke and an end of a compression stroke when the catalyst temperature is equal to or less than the lower limit of the predetermined temperature range during the engine idling operation.

11. An internal combustion engine according to claim 8, wherein the catalyst temperature adjuster increases the catalyst temperature by making the air fuel ratio rich during a first period and thereafter making the air fuel ratio lean for a predetermined period when the catalyst temperature is equal to or less than the lower limit of the predetermined temperature range during the engine idling operation.

12. An internal combustion engine according to claim 1, wherein the catalyst temperature adjuster inhibits an increase of the amount of the inert gas by the inert gas amount controller when the catalyst temperature is equal to or more than an upper limit of the predetermined temperature range.

13. An internal combustion engine according to claim 1, wherein an increase of the amount of the inert gas is executed by the inert gas amount controller, and the catalyst temperature adjuster shifts the air fuel ratio to a lean side when the catalyst temperature is equal to or more than an upper limit of the predetermined temperature range.

14. An internal combustion engine according to claim 1, wherein the catalyst temperature adjuster reduces an operation range in which an increase of the amount of the inert gas is executed by the inert gas amount controller as the catalyst temperature increases.

15. An internal combustion engine according to claim 1, further comprising a fuel controller that shuts off a fuel supply to the combustion chamber, wherein the catalyst temperature adjuster inhibits shutting off of the fuel supply by the fuel controller when the catalyst temperature is equal to or more than an upper limit of the predetermined temperature range.

16. An internal combustion engine according to claim 1, wherein a fuel supply to the combustion chamber is shut off when a vehicle speed is reduced, and a throttle valve provided in the internal combustion engine is closed when the catalyst temperature is within or greater than the predetermined temperature range.

17. An internal combustion engine control method for use with an internal combustion engine in which a generated amount of soot increases to a peak amount when increasing an amount of an inert gas supplied to a combustion chamber, the method comprising:

supplying an amount of inert gas to the combustion chamber that is more than an amount that causes the generated amount of soot to become the peak amount;

detecting a temperature of a catalyst provided in an exhaust passage of the engine to perform an oxidation function; and adjusting the catalyst temperature to be within a predetermined temperature range.

18. A method according to claim 17, wherein the adjusting step increases the catalyst temperature by increasing the temperature of an exhaust gas when the catalyst temperature is equal to or less than a lower limit of the predetermined temperature range during an engine idling operation.

19. A method according to claim 18, wherein the adjusting step increases the catalyst temperature by delaying a fuel injection timing when the catalyst temperature is equal to or less than the lower limit of the predetermined temperature range during the engine idling operation.

20. A method according to claim 18, wherein the adjusting step increases the catalyst temperature by performing a pilot injection and setting an injection timing of a main injection after a compression top dead center when the catalyst temperature is equal to or less than the lower limit of the predetermined temperature range during the engine idling operation.

21. A method according to claim 18, wherein the adjusting step increases the catalyst temperature by reducing a fuel injection pressure when -the catalyst temperature is equal to or less than the lower limit of the predetermined temperature range during the engine idling operation.

22. A method according to claim 18, further comprising a step of recirculating the exhaust gas discharged from the combustion chamber into an engine intake passage using an exhaust gas recirculater, wherein the inert gas is a recirculation exhaust gas recirculated into the engine intake passage, and the adjusting step increases the catalyst temperature by reducing an amount of the recirculation exhaust gas when the catalyst temperature is equal to or less than the lower limit of the predetermined temperature range during the engine idling operation.

23. A method according to claim 18, wherein the adjusting step increases the catalyst temperature by increasing an idling engine speed when the catalyst temperature is equal to or less than the lower limit of the predetermined temperature range during the engine idling operation.

24. A method according to claim 17, wherein the adjusting step increases the catalyst temperature by increasing an amount of unburned hydrocarbon and carbon monoxide discharged into the engine exhaust passage when the catalyst temperature is equal to or less than a lower limit of the predetennined temperature range at a time of an engine idling operation.

25. A method according to claim 24, wherein the adjusting step increases the catalyst temperature by making an air fuel ratio rich when the catalyst temperature is equal to or less than the lower limit of the predetermined temperature range during the engine idling operation.

26. A method according to claim 24, wherein the adjusting step increases the catalyst temperature by separately performing two strokes of a fuel injection, the two strokes including an intake stroke and an end of a compression stroke when the catalyst temperature is equal to or less than the lower limit of the predetermined temperature range during the engine idling operation.

27. A method according to claim 24, wherein the adjusting step increases the catalyst temperature by making the air fuel ratio rich during a first period and thereafter making the air fuel ratio lean for a predetermined period when the catalyst temperature is equal to or less than the lower limit of the predetermined temperature range during the engine idling operation.

28. A method according to claim 17, wherein the adjusting step inhibits an increase of the amount of the inert gas by the inert gas amount controller when the catalyst temperature is equal to or more than an upper limit of the predetermined temperature range.

29. A method according to claim 17, wherein the adjusting step shifts the air fuel ratio to a lean side when the catalyst temperature is equal to or more than an upper limit of the predetermined temperature range.

30. A method according to claim 17, wherein the adjusting step reduces an operation range in which an increase of the amount of the inert gas is executed as the catalyst temperature increases.

31. A method according to claim 17, wherein the adjusting step inhibits shutting off of the fuel supply to the combustion chamber by a fuel controller when the catalyst temperature is equal to or more than an upper limit of the predetermined temperature range.

32. A method according to claim 17, further comprising a step of shutting off a fuel supply to the combustion chamber when a vehicle speed is reduced, and closing a throttle valve provided in the internal combustion engine when the catalyst temperature is within or greater than the predetermined temperature range.

* * * * *